US012579966B2

(12) United States Patent
Jot et al.

(10) Patent No.: US 12,579,966 B2
(45) Date of Patent: Mar. 17, 2026

(54) ACTIVE NOISE CANCELLATION FOR WEARABLE HEAD DEVICE

(71) Applicant: Magic Leap, Inc., Plantation, FL (US)

(72) Inventors: Jean-Marc Jot, Aptos, CA (US); Colby Nelson Leider, Coral Gables, FL (US)

(73) Assignee: MAGIC LEAP, INC., Plantation, FL (US)

( * ) Notice: Subject to any disclaimer, the term of this patent is extended or adjusted under 35 U.S.C. 154(b) by 146 days.

(21) Appl. No.: 18/701,398

(22) PCT Filed: Oct. 18, 2022

(86) PCT No.: PCT/US2022/078313

§ 371 (c)(1),
(2) Date: Apr. 15, 2024

(87) PCT Pub. No.: WO2023/076822

PCT Pub. Date: May 4, 2023

(65) Prior Publication Data

US 2025/0239250 A1 Jul. 24, 2025

Related U.S. Application Data

(60) Provisional application No. 63/271,619, filed on Oct. 25, 2021.

(51) Int. Cl.
*G10K 11/178* (2006.01)

(52) U.S. Cl.
CPC .. *G10K 11/17881* (2018.01); *G10K 11/17815* (2018.01); *G10K 2210/11* (2013.01); *G10K 2210/3038* (2013.01)

(58) Field of Classification Search
None
See application file for complete search history.

(56) References Cited

U.S. PATENT DOCUMENTS 4,852,988 A 8/1989 Velez
6,433,760 B1 8/2002 Vaissie
(Continued)

FOREIGN PATENT DOCUMENTS

CA 2316473 A1 1/2001
CA 2362895 A1 12/2002
CA 2388766 A1 12/2003

OTHER PUBLICATIONS

International Preliminary Report on Patentability mailed May 10, 2024, with Written Opinion, for PCT Application No. PCT/US2022/078313, filed Oct. 18, 2022, six pages.

(Continued)

*Primary Examiner* — Paul W Huber
(74) *Attorney, Agent, or Firm* — KLINTWORTH & ROZENBLAT LLP

(57) ABSTRACT

Examples of the disclosure describe systems and methods for reducing audio effects of fan noise, specifically, for a wearable system. A method wherein operating a fan of a wearable head device; detecting, with a microphone of the wearable head device, noise generated by the fan; generating a fan reference signal, wherein the fan reference signal represents at least one of a speed of the fan, a mode of the fan, a power output of the fan, and a phase of the fan; deriving a transfer function based on the fan reference signal and based further on the detected noise of the fan; generating a compensation signal based on the transfer function; and while operating the fan of the wearable head device, outputting, by a speaker of the wearable head device, an anti-noise signal, wherein the anti-noise signal is based on the compensation signal.

18 Claims, 11 Drawing Sheets

(56) References Cited

U.S. PATENT DOCUMENTS

| | | | |
|---|---|---|---|
| 6,491,391 B1 | 12/2002 | Blum et al. | |
| 6,847,336 B1 | 1/2005 | Lemelson | |
| 6,943,754 B2 | 9/2005 | Aughey | |
| 6,977,776 B2 | 12/2005 | Volkenandt et al. | |
| 7,347,551 B2 | 3/2008 | Fergason et al. | |
| 7,488,294 B2 | 2/2009 | Torch | |
| 8,235,529 B1 | 8/2012 | Raffle | |
| 8,611,015 B2 | 12/2013 | Wheeler | |
| 8,638,498 B2 | 1/2014 | Bohn et al. | |
| 8,696,113 B2 | 4/2014 | Lewis | |
| 8,929,589 B2 | 1/2015 | Publicover et al. | |
| 9,010,929 B2 | 4/2015 | Lewis | |
| 9,274,338 B2 | 3/2016 | Robbins et al. | |
| 9,292,973 B2 | 3/2016 | Bar-zeev et al. | |
| 9,323,325 B2 | 4/2016 | Perez et al. | |
| 9,720,505 B2 | 8/2017 | Gribetz et al. | |
| 9,942,647 B2 * | 4/2018 | Di Censo | H04R 1/1091 |
| 10,013,053 B2 | 7/2018 | Cederlund et al. | |
| 10,025,379 B2 | 7/2018 | Drake et al. | |
| 10,261,555 B1 * | 4/2019 | Cooper | H05K 7/20209 |
| 10,565,979 B1 | 2/2020 | Christian | |
| 11,218,824 B1 * | 1/2022 | Huo | H04R 1/1083 |
| 11,716,829 B1 * | 8/2023 | Tan | H05K 7/20136 361/697 |
| 2003/0030597 A1 | 2/2003 | Geist | |
| 2006/0023158 A1 | 2/2006 | Howell et al. | |
| 2010/0124337 A1 | 5/2010 | Wertz | |
| 2011/0211056 A1 | 9/2011 | Publicover et al. | |
| 2011/0213664 A1 | 9/2011 | Osterhout | |
| 2012/0021806 A1 | 1/2012 | Maltz | |
| 2013/0077147 A1 | 3/2013 | Efimov | |
| 2014/0126735 A1 * | 5/2014 | Gauger, Jr. | G10K 11/17837 381/71.6 |
| 2014/0195918 A1 | 7/2014 | Friedlander | |
| 2015/0168731 A1 | 6/2015 | Robbins | |
| 2017/0175602 A1 | 6/2017 | Nguyen | |
| 2017/0184863 A1 * | 6/2017 | Balachandreswaran | G02B 27/0176 |
| 2020/0312344 A1 | 10/2020 | Hera | |
| 2021/0195360 A1 | 6/2021 | Leider et al. | |
| 2021/0204051 A1 * | 7/2021 | Hanes | H04R 1/1041 |
| 2022/0054867 A1 * | 2/2022 | Adams | B01D 46/0086 |
| 2022/0148557 A1 * | 5/2022 | Reid | A62B 18/006 |
| 2022/0176168 A1 * | 6/2022 | Adams | H04R 1/083 |
| 2022/0182749 A1 * | 6/2022 | Reid | G10K 11/17881 |

OTHER PUBLICATIONS

Jacob, R. "Eye Tracking in Advanced Interface Design", Virtual Environments and Advanced Interface Design, Oxford University Press, Inc. (Jun. 1995).

Rolland, J. et al., "High-resolution inset head-mounted display", Optical Society of America, vol. 37, No. 19, Applied Optics, (Jul. 1, 1998).

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

* cited by examiner

ACTIVE NOISE CANCELLATION FOR WEARABLE HEAD DEVICE

CROSS REFERENCE TO RELATED APPLICATIONS

This application is a U.S. national stage application under 35 U.S.C. § 371 of International Application No. PCT/US2022/078313, filed internationally on Oct. 18, 2022, which, claims priority to U.S. Provisional Application No. 63/271,619, filed on Oct. 25, 2021, the contents of which are incorporated by reference herein in their entirety.

FIELD

This disclosure relates in general to systems and methods for active noise reduction for a wearable system.

BACKGROUND

It may be desirable to increase performance of a wearable computer (e.g., a wearable system including a wearable head device) by incorporating more central processing units (CPUs), graphics processing units (GPUs), embedded processors, digital signal processors (DSPs), and/or power supplies. However, the operations of these electronics components may generate thermal byproducts (e.g., heat). Wearable systems, such as those used in Augmented Reality (AR), Extended Reality (XR), Virtual Reality (VR), or Mixed Reality (MR) devices, may incorporate these components in a beltpack and/or a wearable head device, which may include mechanical fans to dissipate this heat away from the user's body. In some instances, incorporating more electronic components to improve performance would generate more heat, and more mechanical fans (or a more powerful fan) may be needed to dissipate the additional heat. The noise created by these fans may minimize microphone fidelity and/or that of audio presented to a user during playback, limiting acoustic communication intelligibility and end-to-end user experience. Therefore, it may be desirable to mitigate these limitations caused by fan noise, restoring fidelity to audio path and improving the overall user experience while allowing more electronic components to be incorporated to improve performance. More generally, it may also be desirable to efficiently reduce levels of other noises (e.g., ambient noise in an environment, sound generated by a device speaker, motor noise (e.g., from a lens system of a device, from a motorized camera or mic system)).

BRIEF SUMMARY

Examples of the disclosure generally describe systems and methods for active noise reduction for a wearable system. In some embodiments, examples of the disclosure describe systems and methods for reducing effects of fan noise for a wearable system.

In some embodiments, a method comprises: operating a fan of a wearable head device; detecting, with a microphone of the wearable head device, noise generated by the fan; generating a fan reference signal, wherein the fan reference signal represents at least one of a speed of the fan, a mode of the fan, a power output of the fan, and a phase of the fan; deriving a transfer function based on the fan reference signal and based further on the detected noise of the fan; generating a compensation signal based on the transfer function; and while operating the fan of the wearable head device, outputting, by a speaker of the wearable head device, an anti-noise signal, wherein the anti-noise signal is based on the compensation signal.

In some embodiments, the anti-noise signal reduces a level of fan noise received at a second microphone.

In some embodiments, the anti-noise signal reduces a level of fan noise received at an ear canal of a user of the wearable head device.

In some embodiments, the transfer function comprises a fan-to-microphone transfer function.

In some embodiments, the transfer function comprises a fan-to-ear transfer function.

In some embodiments, the noise comprises a frequency in a range of 0 to 4 kHz.

In some embodiments, operating the fan comprises revolving the fan at a rate of 800-5000 revolutions per minute (RPM).

In some embodiments, the method further comprises: changing an operation of the fan from a first state to a second state; detecting, with the microphone, noise of the fan operating at the second state; updating the fan reference signal based on the changing of the operation; deriving a second transfer function based on the updated fan reference signal and the detected noise of the fan operating at the second state; generating a second compensation signal based on the second transfer function; and concurrently with operating the fan at the second state, outputting, by the speaker, a second anti-noise signal, wherein the second anti-noise signal is based on the second compensation signal.

In some embodiments, the wearable head device comprises an acoustic echo canceller; deriving the transfer function is performed via the acoustic echo canceller; and generating the compensation signal is performed via the acoustic echo canceller.

In some embodiments, the method further comprises receiving a second compensation signal, wherein the second compensation signal comprises an output of a deep neural network (DNN) based subtraction based on a recorded sound; and outputting, by the speaker of the wearable head device, a second anti-noise signal, wherein the second anti-noise signal is based on the second compensation signal and is configured to reduce a level of noise associated with the recorded sound.

In some embodiments, the anti-noise signal comprises a periodic signal.

In some embodiments, the method further comprises receiving a speaker reference signal, wherein the transfer function is further based on the speaker reference signal.

In some embodiments, the method further comprises detecting a speaker feed signal from the speaker; and in response to detecting the speaker feed signal, reducing a level of the speaker feed signal.

In some embodiments, the method further comprises aligning a phase of the anti-noise signal with a phase of the noise generated by the fan.

In some embodiments, the anti-noise signal comprises signals having frequencies below 4 kHz.

In some embodiments, a system comprises: a wearable head device comprising a fan, a microphone, and a speaker; and one or more processors configured to execute a method comprising: operating the fan; detecting, with the microphone, noise generated by the fan; generating a fan reference signal, wherein the fan reference signal represents at least one of a speed of the fan, a mode of the fan, a power output of the fan, and a phase of the fan; deriving a transfer function based on the fan reference signal and based further on the detected noise of the fan; generating a compensation signal based on the transfer function; and while operating the fan, outputting, by the speaker, an anti-noise signal, wherein the anti-noise signal is based on the compensation signal.

In some embodiments, the fan is configured to cool the one or more processors.

In some embodiments, the anti-noise signal reduces a level of fan noise received at a second microphone.

In some embodiments, the anti-noise signal reduces a level of fan noise received at an ear canal of a user of the wearable head device.

In some embodiments, the transfer function comprises a fan-to-microphone transfer function.

In some embodiments, the transfer function comprises a fan-to-ear transfer function.

In some embodiments, the noise comprises a frequency in a range of 0 to 4 kHz.

In some embodiments, operating the fan comprises revolving the fan at a rate of 800-5000 RPM.

In some embodiments, the method further comprises: changing an operation of the fan from a first state to a second state; detecting, with the microphone, noise of the fan operating at the second state; updating the fan reference signal based on the changing of the operation; deriving a second transfer function based on the updated fan reference signal and the detected noise of the fan operating at the second state; generating a second compensation signal based on the second transfer function; and concurrently with operating the fan at the second state, outputting, by the speaker, a second anti-noise signal, wherein the second anti-noise signal is based on the second compensation signal.

In some embodiments, the wearable head device comprises an acoustic echo canceller; deriving the transfer function is performed via the acoustic echo canceller; and generating the compensation signal is performed via the acoustic echo canceller.

In some embodiments, the method further comprises: receiving a second compensation signal, wherein the second compensation signal comprises an output of a deep neural network (DNN) based subtraction based on a recorded sound; and outputting, by the speaker of the wearable head device, a second anti-noise signal, wherein the second anti-noise signal is based on the second compensation signal and is configured to reduce a level of noise associated with the recorded sound.

In some embodiments, the anti-noise signal comprises a periodic signal.

In some embodiments, the method further comprises receiving a speaker reference signal, wherein the transfer function is further based on the speaker reference signal.

In some embodiments, the method further comprises: detecting a speaker feed signal from the speaker; and in response to detecting the speaker feed signal, reducing a level of the speaker feed signal.

In some embodiments, the method further comprises aligning a phase of the anti-noise signal with a phase of the noise generated by the fan.

In some embodiments, the anti-noise signal comprises signals having frequencies below 4 kHz.

In some embodiments, a non-transitory computer-readable medium storing instructions that, when executed by one or more processors, cause the one or more processors to execute a method comprising: operating a fan of a wearable head device; detecting, with a microphone of the wearable head device, noise generated by the fan; generating a fan reference signal, wherein the fan reference signal represents at least one of a speed of the fan, a mode of the fan, a power output of the fan, and a phase of the fan; deriving a transfer function based on the fan reference signal and based further on the detected noise of the fan; generating a compensation signal based on the transfer function; and while operating the fan of the wearable head device, outputting, by a speaker of the wearable head device, an anti-noise signal, wherein the anti-noise signal is based on the compensation signal.

In some embodiments, the anti-noise signal reduces a level of fan noise received at a microphone.

In some embodiments, the anti-noise signal reduces a level of fan noise received at an ear canal of a user of the wearable head device.

In some embodiments, the transfer function comprises a fan-to-microphone transfer function.

In some embodiments, the transfer function comprises a fan-to-ear transfer function.

In some embodiments, the noise comprises a frequency in a range of 0 to 4 kHz.

In some embodiments, operating the fan comprises revolving the fan at a rate of 800-5000 RPM.

In some embodiments, the method further comprises: changing an operation of the fan from a first state to a second state; detecting, with the microphone, noise of the fan operating at the second state; updating the fan reference signal based on the changing of the operation; deriving a second transfer function based on the updated fan reference signal and the detected noise of the fan operating at the second state; generating a second compensation signal based on the second transfer function; and concurrently with operating the fan at the second state, outputting, by the speaker, a second anti-noise signal, wherein the second anti-noise signal is based on the second compensation signal.

In some embodiments, the wearable head device comprises an acoustic echo canceller; deriving the transfer function is performed via the acoustic echo canceller; and generating the compensation signal is performed via the acoustic echo canceller.

In some embodiments, the method further comprises: receiving a second compensation signal, wherein the second compensation signal comprises an output of a deep neural network (DNN) based subtraction based on a recorded sound; and outputting, by the speaker of the wearable head device, a second anti-noise signal, wherein the second anti-noise signal is based on the second compensation signal and is configured to reduce a level of noise associated with the recorded sound.

In some embodiments, the anti-noise signal comprises a periodic signal.

In some embodiments, the method further comprises receiving a speaker reference signal, wherein the transfer function is further based on the speaker reference signal.

In some embodiments, the method further comprises: detecting a speaker feed signal from the speaker; and in response to detecting the speaker feed signal, reducing a level of the speaker feed signal.

In some embodiments, the method further comprises aligning a phase of the anti-noise signal with a phase of the noise generated by the fan.

In some embodiments, the anti-noise signal comprises signals having frequencies below 4 kHz.

DETAILED DESCRIPTION

Figure 1A:
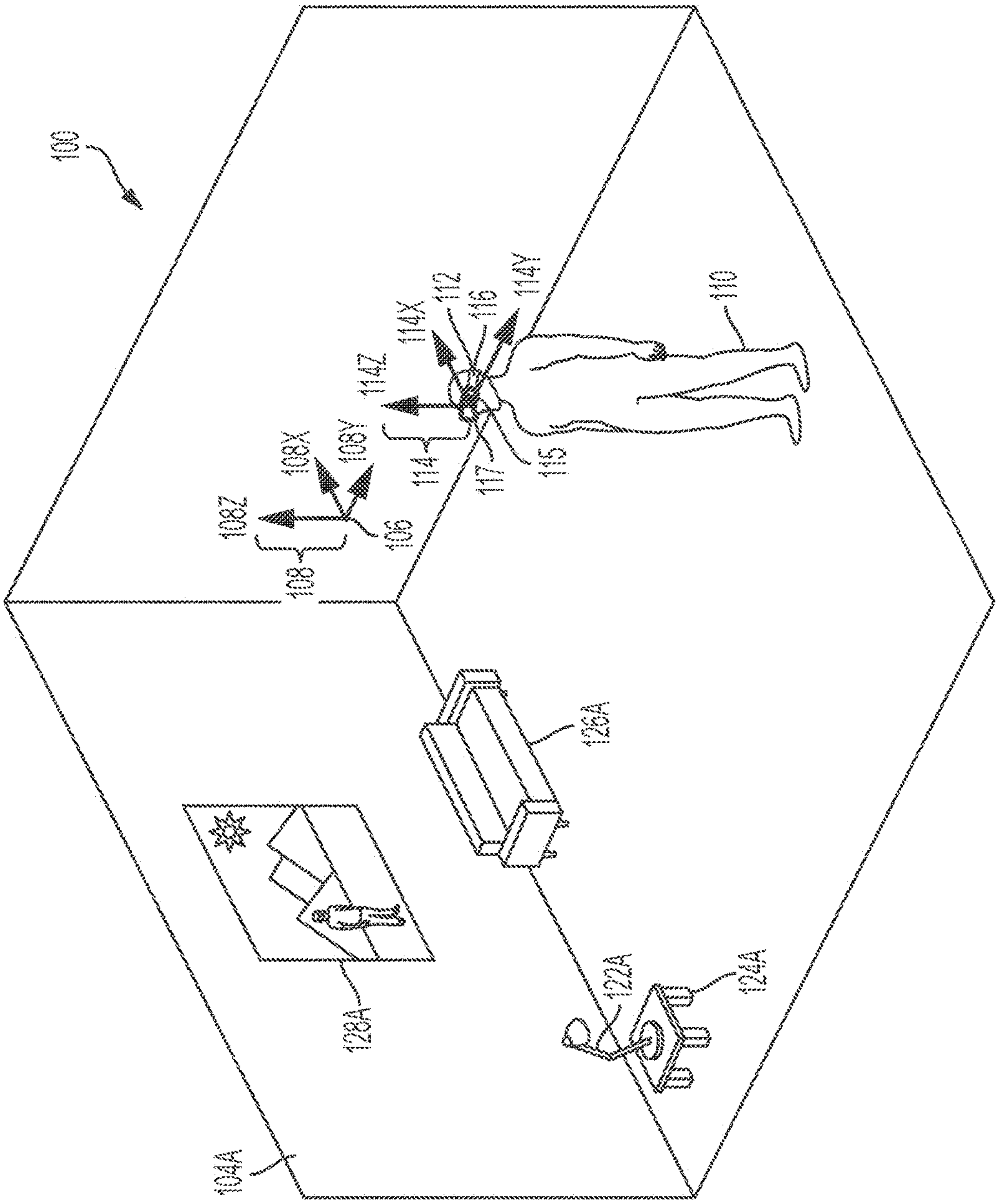
FIGS. 1A-1C illustrate example environments according to some embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Like all people, a user of a MR system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate (e.g., using the methods and systems described herein)—and present the audio signal to a user via one or more speakers.

Because a virtual environment exists as a computational structure, a user may not directly perceive a virtual environment using one's ordinary senses. Instead, a user can perceive a virtual environment indirectly, as presented to the user, for example by a display, speakers, haptic output devices, etc. Similarly, a user may not directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A MR system can present to the user, for example using a transmissive display and/or one or more speakers (which may, for example, be incorporated into a wearable head device), a MR environment ("MRE") that combines aspects of a real environment and a virtual environment. In some embodiments, the one or more speakers may be external to the wearable head device. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

In some examples, virtual objects may have characteristics that resemble corresponding real objects. For instance, a virtual character may be presented in a virtual or mixed reality environment as a life-like figure to provide a user an immersive mixed reality experience. With virtual characters having life-like characteristics, the user may feel like he or she is interacting with a real person. In such instances, it is desirable for actions such as muscle movements and gaze of the virtual character to appear natural. For example, movements of the virtual character should be similar to its corresponding real object (e.g., a virtual human should walk or move its arm like a real human). As another example, the gestures and positioning of the virtual human should appear natural, and the virtual human can initial interactions with the user (e.g., the virtual human can lead a collaborative experience with the user).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted herein, a user may not directly perceive or interact with a virtual environment—a user of an MR system may find it more intuitive and natural to interact with a virtual object by seeing, hearing, and touching a corresponding real object in his or her own real environment. This level of interactivity may heighten a user's feelings of immersion, connection, and engagement with a virtual environment. Similarly, by simultaneously presenting a real environment and a virtual environment, mixed reality systems may reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an exemplary real environment 100 in which a user 110 uses a mixed reality system 112. Mixed reality system 112 may comprise a display (e.g., a transmissive display), one or more speakers, and one or more sensors (e.g., a camera), for example as described herein. The real environment 100 shown comprises a rectangular room 104A, in which user 110 is standing; and real objects 122A (a lamp), 124A (a table), 126A (a sofa), and 128A (a painting). Room 104A may be spatially described with a location coordinate (e.g., coordinate system 108); locations of the real environment 100 may be described with respect to an origin of the location coordinate (e.g., point 106). As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a quaternion matrix, or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a quaternion matrix, or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
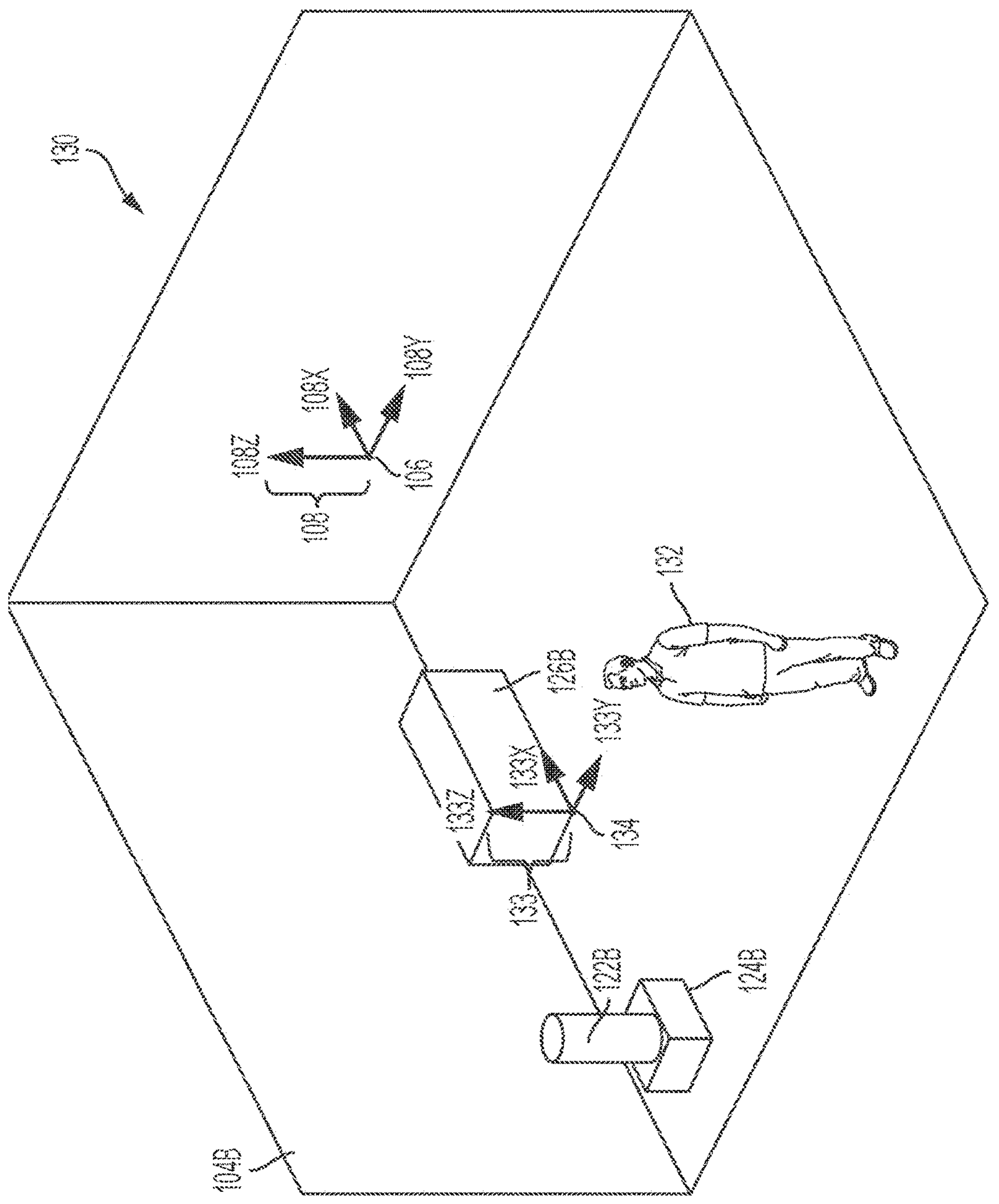

FIG. 1B illustrates an exemplary virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual character 132, which may not correspond to any real object in real environment 100. Real object 128A in real environment 100 may not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a quaternion matrix, or other rotation matrix), or other suitable representation can characterize a transformation between the persistent coordinate system 133 space and the environment/world coordinate system 108 space. In some embodiments, each of the virtual objects 122B, 124B, 126B, and 132 may have its own persistent coordinate point relative to the origin point 134 of the persistent coordinate system 133. In some embodiments, there may be multiple persistent coordinate systems and each of the virtual objects 122B, 124B, 126B, and 132 may have its own persistent coordinate points relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a quaternion matrix, or other rotation matrix), or other suitable representation can characterize a transformation between a real environment coordinate space and a virtual environment coordinate space.

Figure 1C:
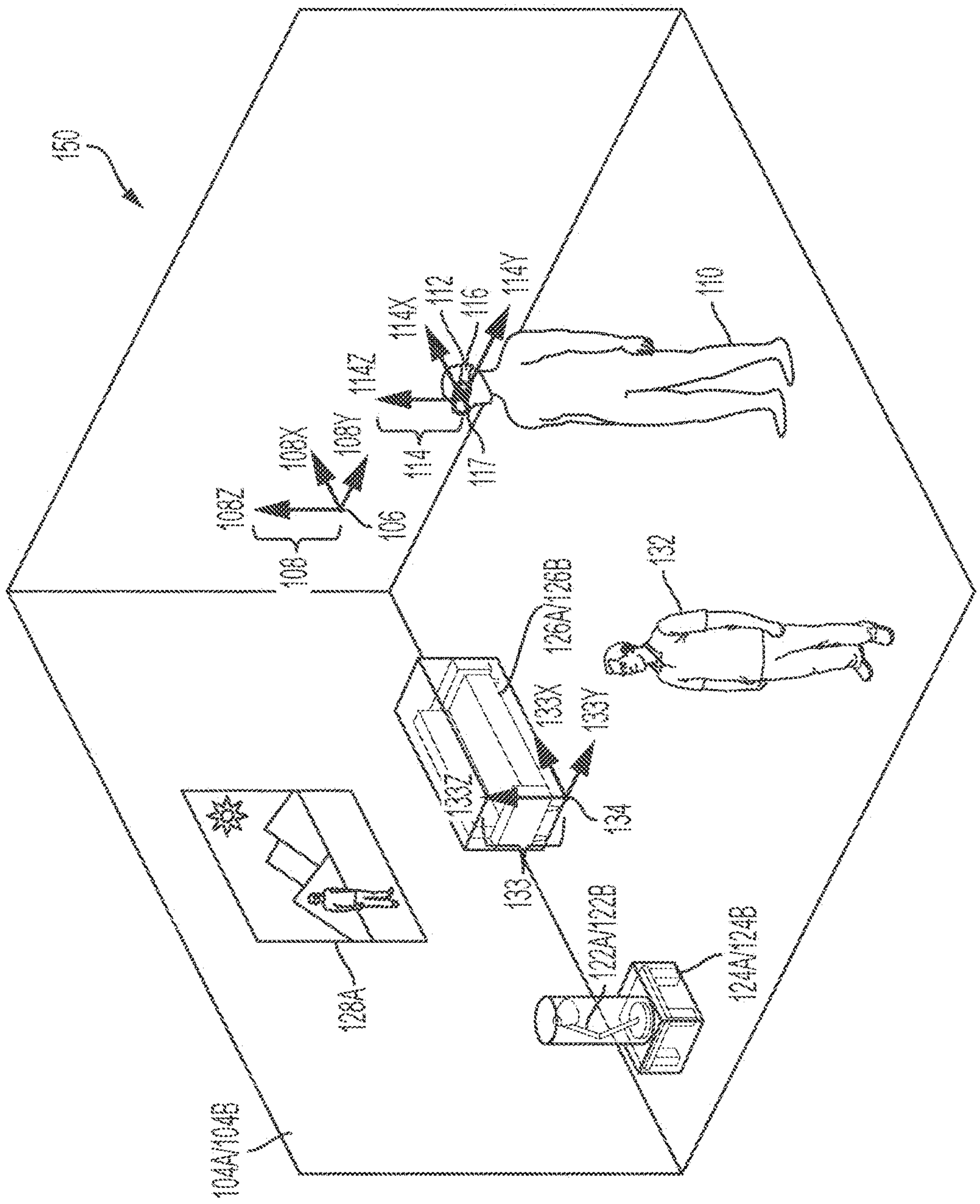

FIG. 1C illustrates an exemplary MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As described herein, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (e.g., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described herein may also incorporate audio aspects. For instance, in MRE 150, virtual character 132 could be associated with one or more audio signals, such as a footstep sound effect that is generated as the character walks around MRE 150. As described herein, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability, mobile network (e.g., 4G, 5G) capability) to communicate with other devices and systems, including neural networks (e.g., in the cloud) for data processing and training data associated with presentation of elements (e.g., virtual character 132) in the MRE 150 and other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described herein.

In some embodiments, an animation rig is used to present the virtual character 132 in the MRE 150. Although the animation rig is described with respect to virtual character 132, it is understood that the animation rig may be associated with other characters (e.g., a human character, an animal character, an abstract character) in the MRE 150.

Figure 2A:
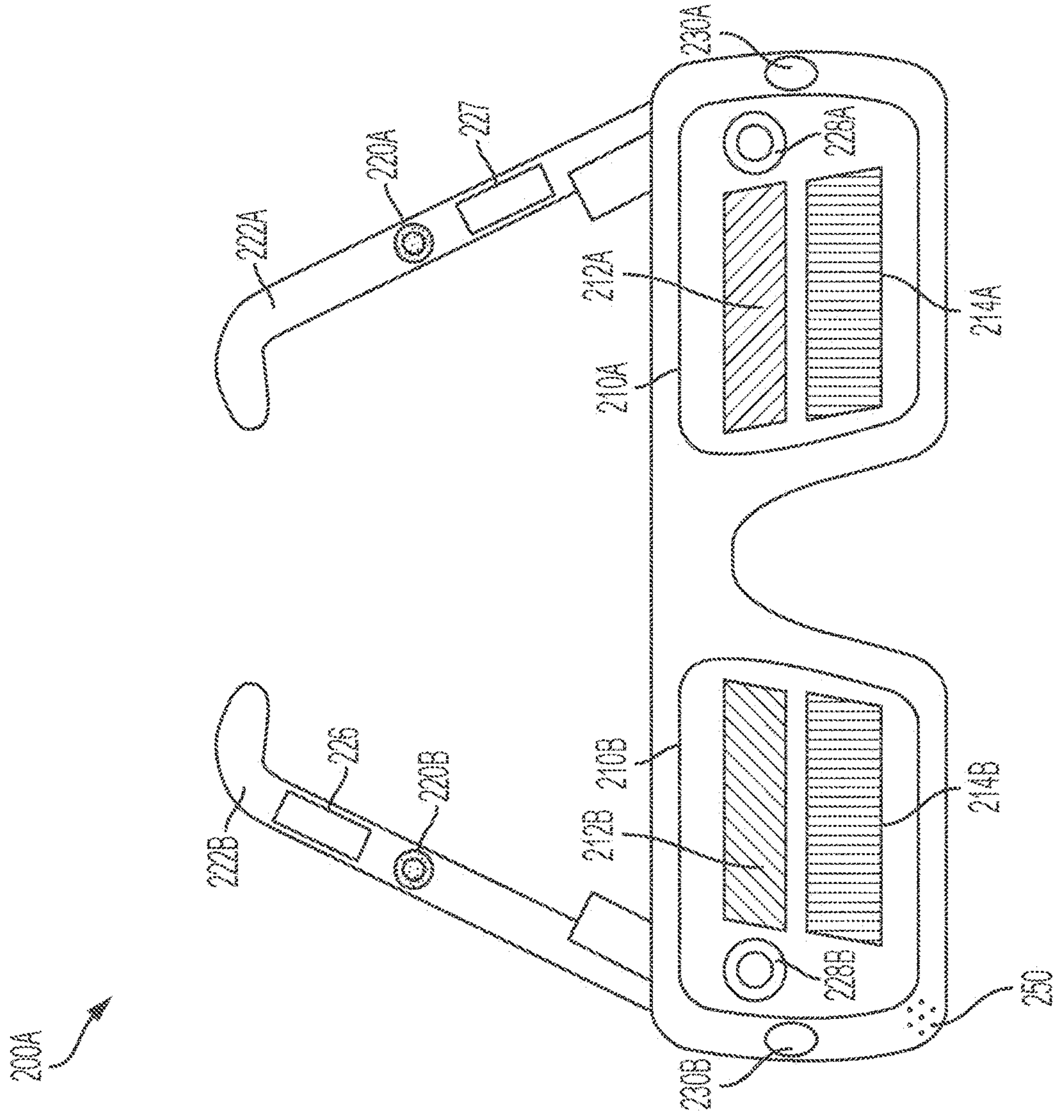
FIGS. 2A-2B illustrate example wearable systems according to some embodiments of the disclosure.

FIG. 2A illustrates an example wearable head device 200A configured to be worn on the head of a user. Wearable head device 200A may be part of a broader wearable system that comprises one or more components, such as a head device (e.g., wearable head device 200A), a handheld controller (e.g., handheld controller 300 described below), and/or an auxiliary unit (e.g., auxiliary unit 400 described below). In some examples, wearable head device 200A can be used for AR, MR, or XR systems or applications. Wearable head device 200A can comprise one or more displays, such as displays 210A and 210B (which may comprise left and right transmissive displays, and associated components for coupling light from the displays to the user's eyes, such as orthogonal pupil expansion (OPE) grating sets 212A/212B and exit pupil expansion (EPE) grating sets 214A/214B); left and right acoustic structures, such as speakers 220A and 220B (which may be mounted on temple arms 222A and 222B, and positioned adjacent to the user's left and right ears, respectively); one or more sensors such as infrared sensors, accelerometers, GPS units, inertial measurement units (IMUs, e.g. IMU 226), acoustic sensors (e.g., microphones 250); orthogonal coil electromagnetic receivers (e.g., receiver 227 shown mounted to the left temple arm 222A); left and right cameras (e.g., depth (time-of-flight) cameras 230A and 230B) oriented away from the user; and left and right eye cameras oriented toward the user (e.g., for detecting the user's eye movements) (e.g., eye cameras 228A and 228B). However, wearable head device 200A can incorporate any suitable display technology, and any suitable number, type, or combination of sensors or other components without departing from the scope of the invention. In some examples, wearable head device 200A may incorporate one or more microphones 250 configured to detect audio signals generated by the user's voice; such microphones may be positioned adjacent to the user's mouth and/or on one or both sides of the user's head. In some examples, wearable head device 200A may incorporate networking features (e.g., Wi-Fi capability) to communicate with other devices and systems, including other wearable systems. Wearable head device 200A may further include components such as a battery, a processor, a memory, a storage unit, or various input devices (e.g., buttons, touchpads); or may be coupled to a handheld controller (e.g., handheld controller 300) or an auxiliary unit (e.g., auxiliary unit 400) that comprises one or more such components. In some examples, sensors may be configured to output a set of coordinates of the head-mounted unit relative to the user's environment, and may provide input to a processor performing a Simultaneous Localization and Mapping (SLAM) procedure and/or a visual odometry algorithm. In some examples, wearable head device 200A may be coupled to a handheld controller 300, and/or an auxiliary unit 400, as described further below.

Figure 2B:
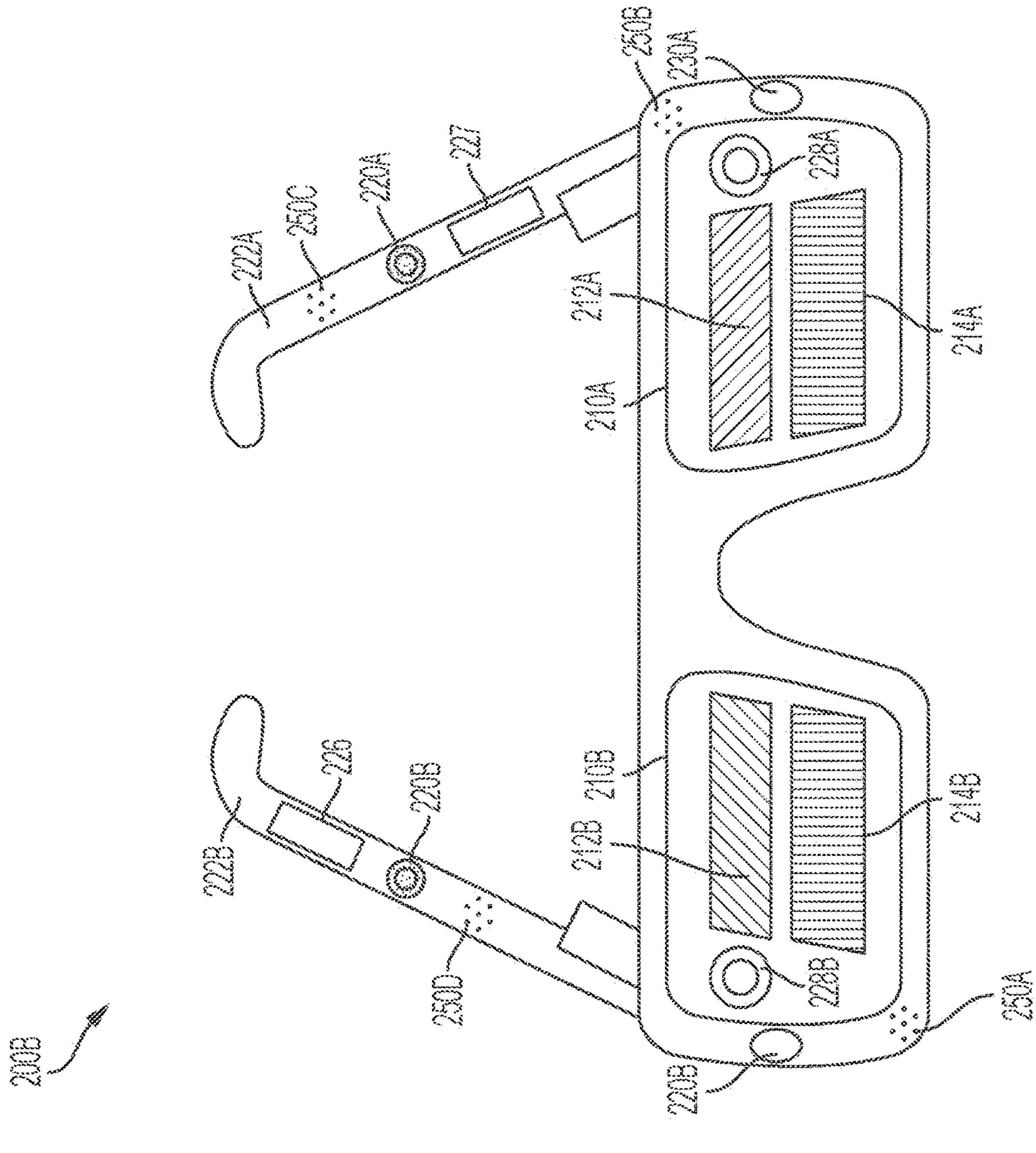

FIG. 2B illustrates an example wearable head device 200B (that can correspond to wearable head device 200A) configured to be worn on the head of a user. In some embodiments, wearable head device 200B can include a multi-microphone configuration, including microphones 250A, 250B, 250C, and 250D. Multi-microphone configurations can provide spatial information about a sound source in addition to audio information. For example, signal processing techniques can be used to determine a relative position of an audio source to wearable head device 200B based on the amplitudes of the signals received at the multi-microphone configuration. If the same audio signal is received with a larger amplitude at microphone 250A than at 250B, it can be determined that the audio source is closer to microphone 250A than to microphone 250B. Asymmetric or symmetric microphone configurations can be used. In some embodiments, it can be advantageous to asymmetrically configure microphones 250A and 250B on a front face of wearable head device 200B. For example, an asymmetric configuration of microphones 250A and 250B can provide spatial information pertaining to height (e.g., a distance from a first microphone to a voice source (e.g., the user's mouth, the user's throat) and a second distance from a second microphone to the voice source are different). This can be used to distinguish a user's speech from other human speech. For example, a ratio of amplitudes received at microphone 250A and at microphone 250B can be expected for a user's mouth to determine that an audio source is from the user. In some embodiments, a symmetrical configuration may be able to distinguish a user's speech from other human speech to the left or right of a user. Although four microphones are shown in FIG. 2B, it is contemplated that any suitable number of microphones can be used, and the microphone(s) can be arranged in any suitable (e.g., symmetrical or asymmetrical) configuration.

Figure 3:
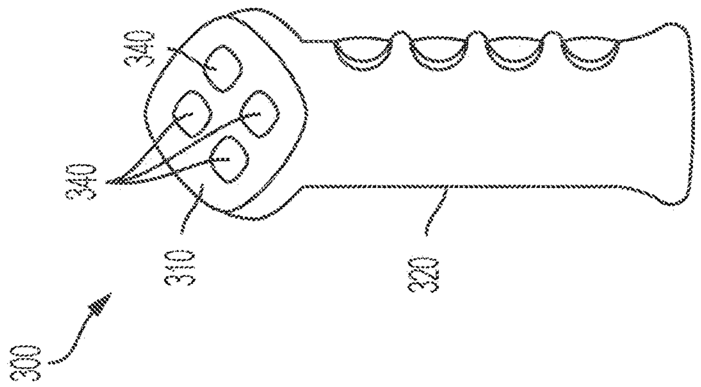
FIG. 3 illustrates an example handheld controller that can be used in conjunction with an example wearable system according to some embodiments of the disclosure.

FIG. 3 illustrates an example mobile handheld controller component 300 of an example wearable system. In some examples, handheld controller 300 may be in wired or wireless communication with wearable head device 200A and/or 200B and/or auxiliary unit 400 described below. In some examples, handheld controller 300 includes a handle portion 320 to be held by a user, and one or more buttons 340 disposed along a top surface 310. In some examples, handheld controller 300 may be configured for use as an optical tracking target; for example, a sensor (e.g., a camera or other optical sensor) of wearable head device 200A and/or 200B can be configured to detect a position and/or orientation of handheld controller 300—which may, by extension, indicate a position and/or orientation of the hand of a user holding handheld controller 300. In some examples, handheld controller 300 may include a processor, a memory, a storage unit, a display, or one or more input devices, such as ones described herein. In some examples, handheld controller 300 includes one or more sensors (e.g., any of the sensors or tracking components described herein with respect to wearable head device 200A and/or 200B). In some examples, sensors can detect a position or orientation of handheld controller 300 relative to wearable head device 200A and/or 200B or to another component of a wearable system. In some examples, sensors may be positioned in handle portion 320 of handheld controller 300, and/or may be mechanically coupled to the handheld controller. Handheld controller 300 can be configured to provide one or more output signals, corresponding, for example, to a pressed state of the buttons 340; or a position, orientation, and/or motion of the handheld controller 300 (e.g., via an IMU). Such output signals may be used as input to a processor of wearable head device 200A and/or 200B, to auxiliary unit 400, or to another component of a wearable system. In some examples, handheld controller 300 can include one or more microphones to detect sounds (e.g., a user's speech, environmental sounds), and in some cases provide a signal corresponding to the detected sound to a processor (e.g., a processor of wearable head device 200A and/or 200B).

Figure 4:
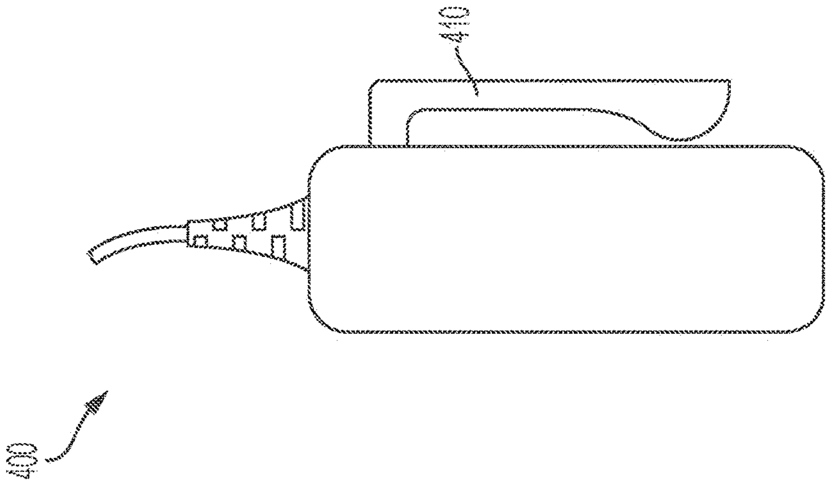
FIG. 4 illustrates an example auxiliary unit that can be used in conjunction with an example wearable system according to some embodiments of the disclosure.

FIG. 4 illustrates an example auxiliary unit 400 of an example wearable system. In some examples, auxiliary unit 400 may be in wired or wireless communication with wearable head device 200A and/or 200B and/or handheld controller 300. The auxiliary unit 400 can include a battery to primarily or supplementally provide energy to operate one or more components of a wearable system, such as wearable head device 200A and/or 200B and/or handheld controller 300 (including displays, sensors, acoustic structures, processors, microphones, and/or other components of wearable head device 200A and/or 200B or handheld controller 300). In some examples, auxiliary unit 400 may include a processor, a memory, a storage unit, a display, one or more input devices, and/or one or more sensors, such as ones described herein. In some examples, auxiliary unit 400 includes a clip 410 for attaching the auxiliary unit to a user (e.g., attaching the auxiliary unit to a belt worn by the user). An advantage of using auxiliary unit 400 to house one or more components of a wearable system is that doing so may allow larger or heavier components to be carried on a user's waist, chest, or back—which are relatively well suited to support larger and heavier objects—rather than mounted to the user's head (e.g., if housed in wearable head device 200A and/or 200B) or carried by the user's hand (e.g., if housed in handheld controller 300). This may be particularly advantageous for relatively heavier or bulkier components, such as batteries.

Figure 5A:
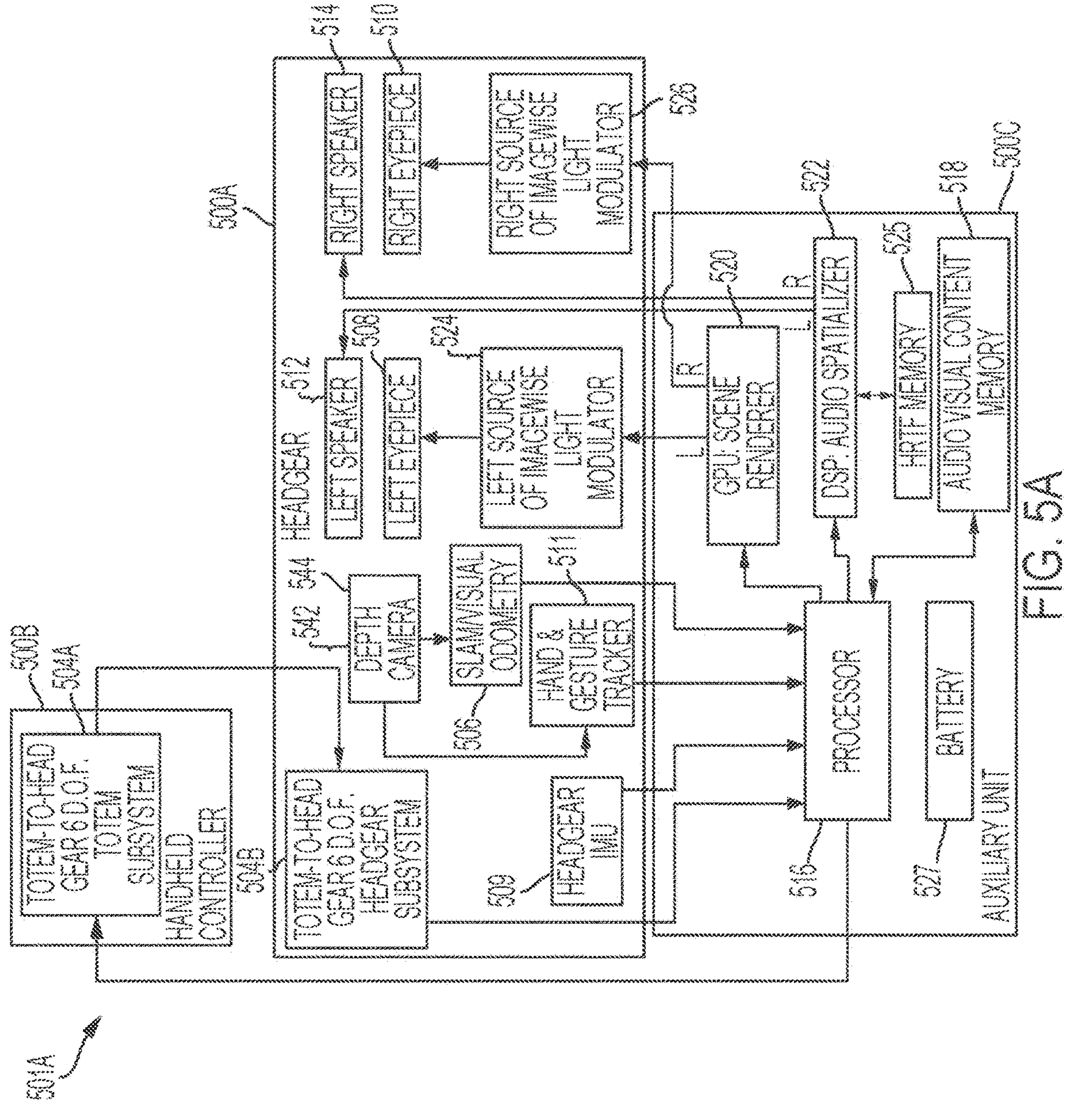
FIGS. 5A-5B illustrate example functional block diagrams for an example wearable system according to some embodiments of the disclosure.

FIG. 5A shows an example functional block diagram that may correspond to an example wearable system 501A; such system may include example wearable head device 200A and/or 200B, handheld controller 300, and auxiliary unit 400 described herein. In some examples, the wearable system 501A could be used for AR, MR, or XR applications. As shown in FIG. 5, wearable system 501A can include example handheld controller 500B, referred to here as a "totem" (and which may correspond to handheld controller 300); the handheld controller 500B can include a totem-to-headgear six degree of freedom (6DOF) totem subsystem 504A. Wearable system 501A can also include example headgear device 500A (which may correspond to wearable head device 200A and/or 200B); the headgear device 500A includes a totem-to-headgear 6DOF headgear subsystem 504B. In the example, the 6DOF totem subsystem 504A and the 6DOF headgear subsystem 504B cooperate to determine six coordinates (e.g., offsets in three translation directions and rotation along three axes) of the handheld controller 500B relative to the headgear device 500A. The six degrees of freedom may be expressed relative to a coordinate system of the headgear device 500A. The three translation offsets may be expressed as X, Y, and Z offsets in such a coordinate system, as a translation matrix, or as some other representation. The rotation degrees of freedom may be expressed as sequence of yaw, pitch and roll rotations; as vectors; as a rotation matrix; as a quaternion; or as some other representation. In some examples, one or more depth cameras 544 (and/or one or more non-depth cameras) included in the headgear device 500A; and/or one or more optical targets (e.g., buttons 340 of handheld controller 300 as described, dedicated optical targets included in the handheld controller) can be used for 6DOF tracking. In some examples, the handheld controller 500B can include a camera, as described; and the headgear device 500A can include an optical target for optical tracking in conjunction with the camera. In some examples, the headgear device 500A and the handheld controller 500B each include a set of three orthogonally oriented solenoids which are used to wirelessly send and receive three distinguishable signals. By measuring the relative magnitude of the three distinguishable signals received in each of the coils used for receiving, the 6DOF of the handheld controller 500B relative to the headgear device 500A may be determined. In some examples, 6DOF totem subsystem 504A can include an Inertial Measurement Unit (IMU) that is useful to provide improved accuracy and/or more timely information on rapid movements of the handheld controller 500B.

Figure 5B:
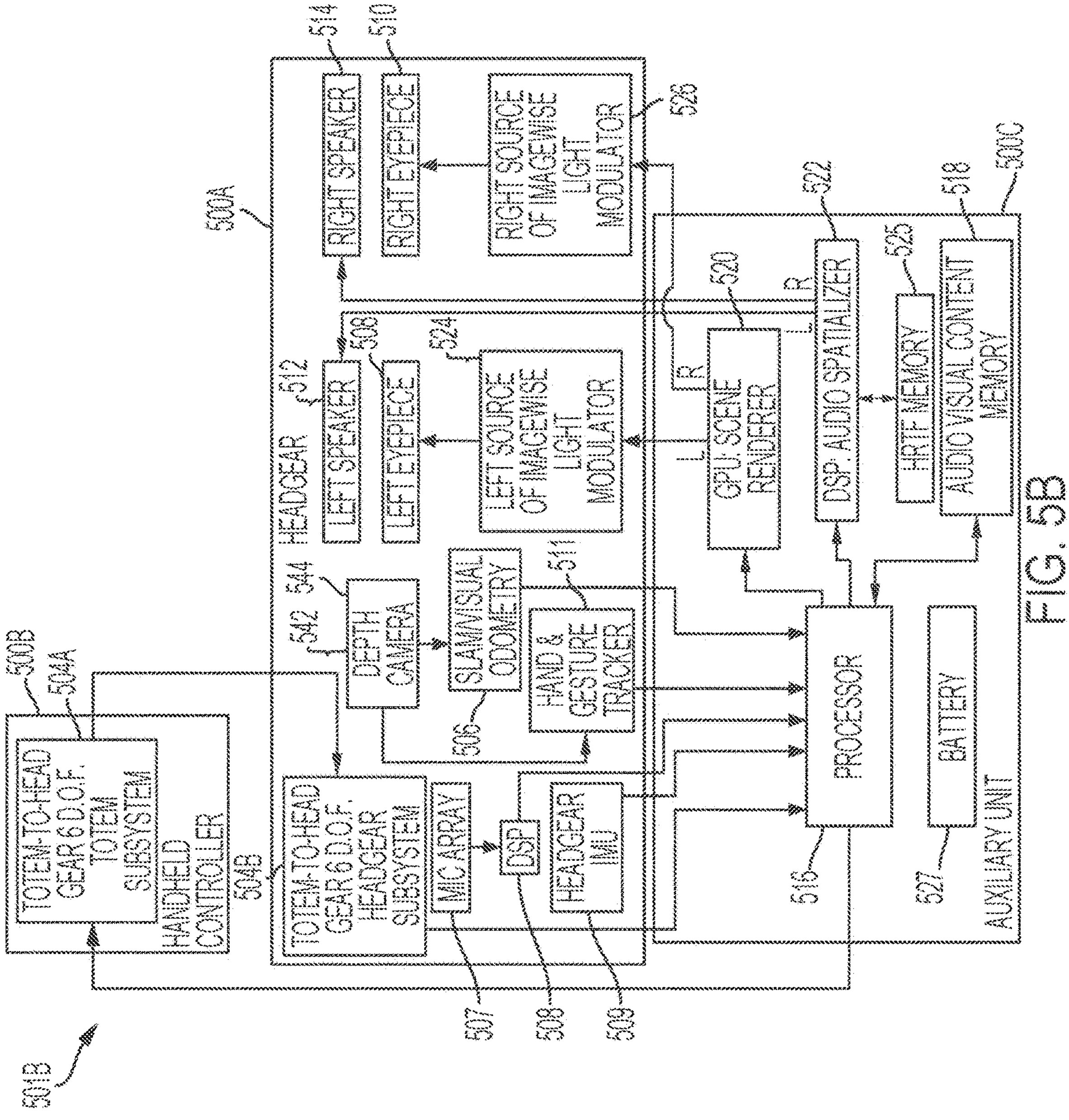

FIG. 5B shows an example functional block diagram that may correspond to an example wearable system 501B (which can correspond to example wearable system 501A). In some embodiments, wearable system 501B can include microphone array 507, which can include one or more microphones arranged on headgear device 500A. In some embodiments, microphone array 507 can include four microphones. Two microphones can be placed on a front face of headgear 500A, and two microphones can be placed at a rear of head headgear 500A (e.g., one at a back-left and one at a back-right), such as the configuration described with respect to FIG. 2B. The microphone array 507 can include any suitable number of microphones, and can include a single microphone. In some embodiments, signals received by microphone array 507 can be transmitted to DSP 508. DSP 508 can be configured to perform signal processing on the signals received from microphone array 507. For example, DSP 508 can be configured to perform noise reduction, acoustic echo cancellation, and/or beamforming on signals received from microphone array 507. DSP 508 can be configured to transmit signals to processor 516. In some embodiments, the system 501B can include multiple signal processing stages that may each be associated with one or more microphones. In some embodiments, the multiple signal processing stages are each associated with a microphone of a combination of two or more microphones used for beamforming. In some embodiments, the multiple signal processing stages are each associated with noise reduction or echo-cancellation algorithms used to pre-process a signal used for either voice onset detection, key phrase detection, or endpoint detection.

In some examples involving augmented reality or mixed reality applications, it may be desirable to transform coordinates from a local coordinate space (e.g., a coordinate space fixed relative to headgear device 500A) to an inertial coordinate space, or to an environmental coordinate space. For instance, such transformations may be necessary for a display of headgear device 500A to present a virtual object at an expected position and orientation relative to the real environment (e.g., a virtual person sitting in a real chair, facing forward, regardless of the position and orientation of headgear device 500A), rather than at a fixed position and orientation on the display (e.g., at the same position in the display of headgear device 500A). This can maintain an illusion that the virtual object exists in the real environment (and does not, for example, appear positioned unnaturally in the real environment as the headgear device 500A shifts and rotates). In some examples, a compensatory transformation between coordinate spaces can be determined by processing imagery from the depth cameras 544 (e.g., using a Simultaneous Localization and Mapping (SLAM) and/or visual odometry procedure) in order to determine the transformation of the headgear device 500A relative to an inertial or environmental coordinate system. In the example shown in FIG. 5, the depth cameras 544 can be coupled to a SLAM/visual odometry block 506 and can provide imagery to block 506. The SLAM/visual odometry block 506 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from an IMU 509 of headgear device 500A. Information from the IMU 509 can be integrated with information from the SLAM/visual odometry block 506 to provide improved accuracy and/or more timely information on rapid adjustments of the user's head pose and position.

In some examples, the depth cameras 544 can supply 3D imagery to a hand gesture tracker 511, which may be implemented in a processor of headgear device 500A. The hand gesture tracker 511 can identify a user's hand gestures, for example by matching 3D imagery received from the depth cameras 544 to stored patterns representing hand gestures. Other suitable techniques of identifying a user's hand gestures will be apparent.

In some examples, one or more processors 516 may be configured to receive data from headgear subsystem 504B, the IMU 509, the SLAM/visual odometry block 506, depth cameras 544, microphones 550; and/or the hand gesture tracker 511. The processor 516 can also send and receive control signals from the 6DOF totem system 504A. The processor 516 may be coupled to the 6DOF totem system 504A wirelessly, such as in examples where the handheld controller 500B is untethered. Processor 516 may further communicate with additional components, such as an audio-visual content memory 518, a Graphical Processing Unit (GPU) 520, and/or a Digital Signal Processor (DSP) audio spatializer 522. The DSP audio spatializer 522 may be coupled to a Head Related Transfer Function (HRTF) memory 525. The GPU 520 can include a left channel output coupled to the left source of imagewise modulated light 524 and a right channel output coupled to the right source of imagewise modulated light 526. GPU 520 can output stereoscopic image data to the sources of imagewise modulated light 524, 526. The DSP audio spatializer 522 can output audio to a left speaker 512 and/or a right speaker 514. The DSP audio spatializer 522 can receive input from processor 519 indicating a direction vector from a user to a virtual sound source (which may be moved by the user, e.g., via the handheld controller 500B). Based on the direction vector, the DSP audio spatializer 522 can determine a corresponding HRTF (e.g., by accessing a HRTF, or by interpolating multiple HRTFs). The DSP audio spatializer 522 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 5, one or more of processor 516, GPU 520, DSP audio spatializer 522, HRTF memory 525, and audio/visual content memory 518 may be included in an auxiliary unit 500C (which may correspond to auxiliary unit 400). The auxiliary unit 500C may include a battery 527 to power its components and/or to supply power to headgear device 500A and/or handheld controller 500B. Including such components in an auxiliary unit, which can be mounted to a user's waist, can limit or reduce the size and weight of headgear device 500A, which can in turn reduce fatigue of a user's head and neck. In some embodiments, the auxiliary unit is a cell phone, tablet, or a second computing device.

While FIGS. 5A and 5B present elements corresponding to various components of an example wearable systems 501A and 501B, various other suitable arrangements of these components will become apparent to those skilled in the art. For example, the headgear device 500A illustrated in FIG. 5A or FIG. 5B may include a processor and/or a battery (not shown). The included processor and/or battery may operate together with or operate in place of the processor and/or battery of the auxiliary unit 500C. Generally, as another example, elements presented or functionalities described with respect to FIG. 5 as being associated with auxiliary unit 500C could instead be associated with headgear device 500A or handheld controller 500B. Furthermore, some wearable systems may forgo entirely a handheld controller 500B or auxiliary unit 500C. Such changes and modifications are to be understood as being included within the scope of the disclosed examples.

Figure 6:
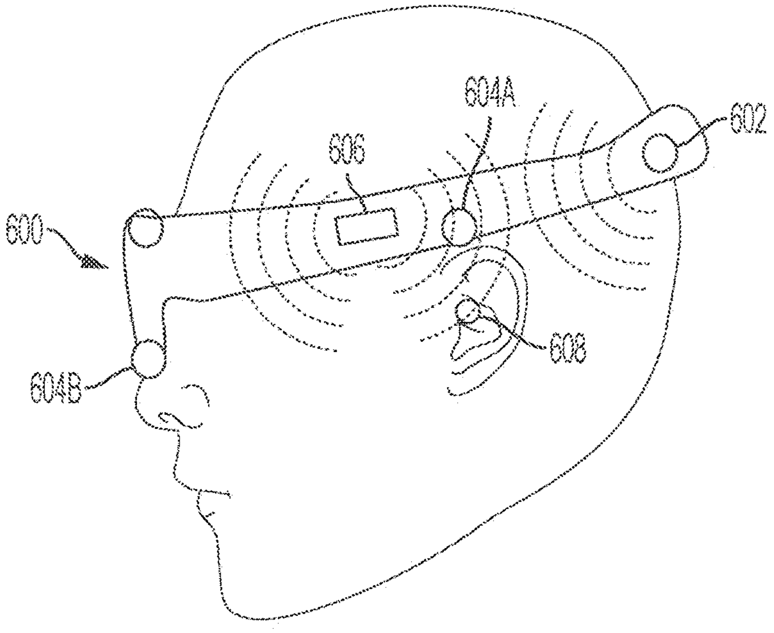
FIG. 6 illustrates an exemplary wearable head device according to some embodiments of the disclosure.

FIG. 6 illustrates an exemplary wearable head device 600 according to some embodiments of the disclosure. In some embodiments, the wearable head device 600 includes a fan 602, a first microphone 604A, a second microphone 604B, and a speaker 606. For example, the first microphone 604 and/or the second microphone 604B may microphone of MR system 112, be microphone 250, one of more of microphones 250A, 250B, 250C, and 250D, microphone of handheld controller 300, or microphone array 507, and speaker 606 may be speaker 220A, speaker 220B, speaker 512, or speaker 514. In some embodiments, the wearable head device 600 is configured to reduce the effects of fan 602 noise (e.g., mitigate the audibility of fan noise), e.g., in a frequency range up to 4 kHz (e.g., up to 3 kHz, up to 4 kHz), up to a frequency corresponding to a fraction (e.g., ⅙) of a wavelength of a distance between a speaker and an ear canal.

Given a distance D between a speaker (e.g., speaker 606, a closest speaker to the ear canal) and the ear canal (e.g., ear canal 608, tympanic membrane), the frequency f of an acoustic wave whose wavelength λ fits is given by $\lambda = c/f$, where c is the speed of sound. If $D = \lambda$ is 1 cm (e.g., corresponding to the wearable head device 600), the corresponding frequency is 345 m/s÷0.01 m=34500, or 34.5 kHz. That is, a full period of a 34.5 kHz signal would fit in between the speaker and the ear. In some embodiments, an out-of-phase anti-noise signal is generated to cancel the acoustic fan noise up to this frequency.

In some instances, it may not be practical to cancel up to this frequency. First, the adaptive filter in acoustic noise cancelling circuits may exhibit a slight latency (e.g., due to A/D conversion and other inherent factors). For example, a latency of 1 ms may be experienced, and the frequency that corresponds to this latency is 1/0.001=1 kHz. Also, due to movements of the face and ears, the distance may not constant. Therefore, in some embodiments, the wearable head device 600 is configured to reduce the effects of fan 602 noise up to around 3 kHz, to account for potential latency while maximizing a spectrum of fan noise level to reduce.

In some embodiments, the first microphone 604A is proximal (e.g., less than 10 cm) to the ear canal 608. By locating the microphone 604A proximal to the user's ear, ambient noise around the user's ears may be more accurately detected, and a speaker output signal (e.g., configured for acoustic cancellation) may more accurately cancel the ambient noise.

In some embodiments, the fan 602 is configured to reduce heat from heat-generating components of the wearable head device 600 (e.g., processor of MR system 112, processor of wearable head device 200A, processor of wearable head device 200B, processor of handheld controller 300, processor of auxiliary unit 400, processor 516, GPU 520, DSP 522). In some embodiments, the fan 602 radiates minimal power at certain frequencies (e.g., higher than 4 kHz). For example, the fan 602 radiates minimal power at higher frequencies (e.g., higher than 4 kHz), and the wearable head device 600 is configured to reduce effects of fan noise (e.g., reduce a level of fan noise received at a microphone, reduce a level of fan noise received at an ear canal of a user of the wearable head device), e.g., at lower frequencies. In some embodiments, the effects of noise may vary more at higher frequencies (e.g., due to variance in ear placement relative to the wearable head device (e.g., location of ear canal 608), pinna diffraction effects (e.g., above 4 kHz), ear position, and/or ear shape). Therefore, it may be more difficult to compensate for noise at higher frequencies with more certainty. By minimizing fan power at higher frequencies, the need to compensate for this varying noise at higher frequencies may be advantageously minimized.

In some embodiments, the noise from the fan 602 comprises a periodic signal (e.g., because the motion of the fan is periodic, the noise is mainly periodic). For example, the noise comprises multiple dominate frequency components. The periodicity of the fan noise advantageously may allow the wearable head device time to compute the appropriate anti-noise output for reducing the noise (e.g., an anti-noise signal comprising a periodic signal), such that real time noise reduction is not required. For example, after the wearable head device computes the appropriate anti-noise signal, the wearable head device may delay the periodic anti-noise signal such that the anti-noise signal and noise signal are in-phase (e.g., the anti-noise signal is a negative signal) or out-of-phase (e.g., the anti-noise signal is a positive signal). In some embodiments, this delay is adjusted (e.g., the phase of the anti-noise signal is adjusted) until the effect of fan noise is at a minimum. In some embodiment, this delay is determined based on information about the fan (e.g., from the fan reference signal, determined from detected sounds of the fan).

In some embodiments, the fan noise is reduced using acoustic echo cancellation (AEC). As described in more detail herein, based on the determined amount of fan noise, the wearable head device 600 is configured to reduce effects of noise from fan 602 and/or from the ambient environment by generating an anti-noise audio signal from the speaker 606 (e.g., to destructively interfere with the noise and cancel out at least a portion of the noise). For example, the wearable head device 600 is configured to reduce the effects of fan and/or ambient noise on a speaker output (e.g., reducing interference between the fan and/or ambient noise with audio output, as perceived by the listener (e.g., at the ear canal)). As another example, the wearable head device 600 is configured to reduce the effects of fan and/or ambient noise on a mic input (e.g., reducing interference between the fan and/or ambient noise with a voice or audio input (e.g., at the microphone location)). In some embodiments, noise cancellation is achieved using a digital signal processor (e.g., based on programming). In some embodiments, noise cancellation is achieved using analog circuitry (e.g., based on circuit components).

In some embodiments, the processing for noise level reduction is performed with a processor of the wearable head device. In some embodiments, the processing for noise level reduction is performed with an auxiliary unit. In some embodiments, the processing for noise level reduction is performed with a second electronic device. In some embodiments, the processing for noise level reduction is performed at a server or a nearby edge device in communication with the wearable head device.

In some embodiments, to improve performance, the wearable head device 600 includes more performance contributing components, such as CPUs, GPUs, embedded processors, DSPs, and/or power supplies, all of which may produce heat during operation. The fan 602 may be designed to reduce the heat produced during operation (e.g., to dissipate heat away from a user's body, to reduce heat from these components to optimize performance and reliability). In some instances, incorporating more electronic components to improve performance would generate more heat, and more fans 602 (or a more powerful fan 602) may be needed to dissipate the additional heat. The noise created by these fans may minimize microphone fidelity and/or that of audio presented to a user during playback, limiting acoustic communication intelligibility and end-to-end user experience. In some embodiments, the wearable head device 600 advantageously mitigates these limitations caused by fan noise, restoring fidelity to audio path and improving the overall user experience while allowing more electronic components to be incorporated to improve performance.

Although one side of the wearable head device 600 is described, it is understood the components described with respect to FIG. 6 are not limited to being located on a specific side. The fan, the speaker, or the microphone may be located on a right side, backside, or front side of the wearable head device, instead of or in addition to the left side. The speaker may be configured to reduce the effects of the fan noise according to a location of the fan.

It is also understood that additional components may be located on other sides of the wearable head device. In some embodiments, the wearable head device also includes microphones and a speaker on its right side at symmetrical locations. For example, the right side of the wearable head device also includes a fan, microphones, and speakers on its right side at symmetrical locations. As such, the speakers on the right side may be configured to reduce effects of the right side fan (e.g., by outputting an anti-noise signal), as disclosed herein. Additionally, the speakers on the left side may be configured to reduce effects of both fans, and the speakers on the right side may be configured to reduce effects of both fans.

It is also understood that the number of microphones, microphone locations, number of speakers, and speaker locations described with respect to FIG. 6 are exemplary. For example, the wearable head device may include more than two microphones on each side. As another example, the microphones of the wearable head device may be arranged differently than illustrated. For example, the microphones can be adjustable (e.g., based on dimensions of a user's head, based on distance of a user's mouth to a mic, based on a position of a sound source being recorded, based on a position of a noise source to be avoided). As another example, the wearable head device may include more than one microphone on each side. As yet another example, the wearable head device may include more than one speaker on each side. As yet another example, the speakers of the wearable head device may be arranged differently than illustrated. As yet another example, some of the microphones or speakers maybe located at a different part (e.g., handheld controller 300, auxiliary unit 400) of a corresponding system (e.g., an AR, MR, or XR system that comprises the wearable head device).

Figure 7:
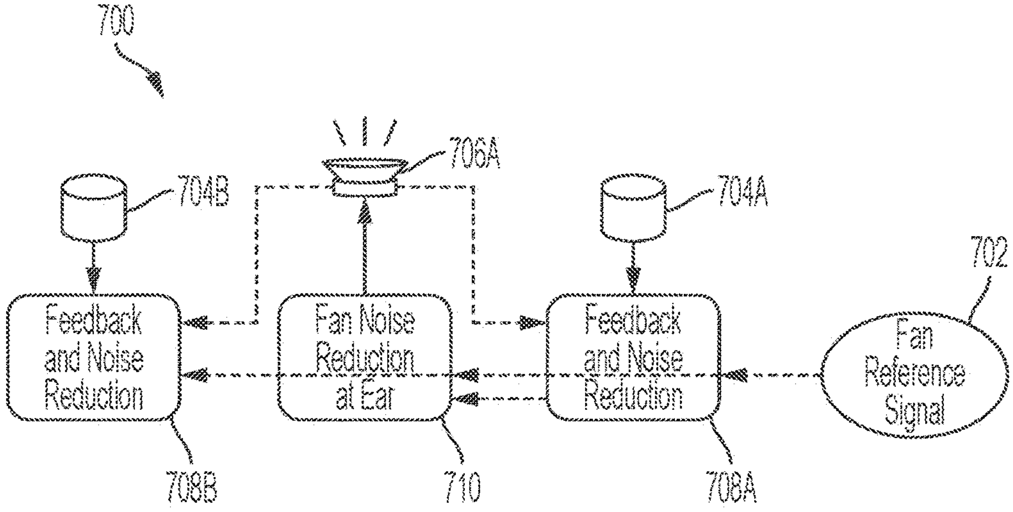
FIG. 7 illustrates an exemplary functional block diagram for an exemplary wearable head device according to some embodiments of the disclosure.

FIG. 7 illustrates an exemplary functional block diagram for an exemplary wearable head device 700 according to some embodiments of the disclosure. In some embodiments, as illustrated, the wearable head device 700 includes a fan reference signal 702, a first microphone 704A, a second microphone 704B, a speaker 706, a first feedback and noise reduction block 708A, a second feedback and noise reduction block 708B, and a fan noise reduction block 710. In some embodiments, the wearable head device 700 is configured to reduce the effects of fan noise (e.g., mitigate the audibility of fan 602 noise), e.g., in a frequency range up to 4 kHz.

In some embodiments, the functional block diagram is for the wearable head device 600. For example, the first microphone 704A corresponds to the first microphone 604A, the second microphone 704B corresponds to the second microphone 604B, the speaker 706 corresponds to the speaker 606, and the fan reference signal 702 corresponds to the fan 602. In some embodiments, functions of some or all of the fan reference signal 702, the first feedback and noise reduction block 708A, the second feedback and noise reduction block 708B, and the fan noise reduction block 710 are performed by one or more processor of the wearable head device (e.g., processor of MR system 112, processor of wearable head device 200A, processor of wearable head device 200B, processor of handheld controller 300, processor of auxiliary unit 400, processor 516, GPU 520, DSP 522).

In some embodiments, the fan reference signal 702 is a reference signal representation (e.g., a voltage, a current, a digital value, an electrical signal) of a state of a fan (e.g., fan 602) of the wearable head device. In some embodiments, the fan reference signal 702 is indicative of power output, speed, phase, or mode of a corresponding fan (e.g., fan 602) of the wearable head device. As illustrated, the fan reference signal 702 is provided to the feedback and noise reduction blocks 708A and 708B.

In some embodiments, the fan state data (e.g., fan speed, fan mode, fan power output, fan phase) are determined by correlating real-time acoustical spectral data detected from the fan with spectra pre-analyzed from pre-recorded fan states. In some embodiments, the pre-recorded fan states are determined by placing the fan in the corresponding states in an anechoic chamber, recording the sound (e.g., recording one period of the fan noise), associating the recordings with a fan state (e.g., by including metadata with the recording), and using this data to train a deep-learning-based classifier. In some embodiments, the pre-recorded fan states are determined by placing the fan in the corresponding states in an anechoic chamber, recording the sound (e.g., recording one period of the fan noise), annotating the recordings (e.g., by including metadata with the recording), computing spectral and temporal features of the recordings, and using the data to train and test a feature-based classifier.

For example, in some embodiments, the fan noise comprises multiple pitches (e.g., harmonically related spectral lines) and inharmonic spectral content (e.g., non-harmonically related). If the fan noise is determined to comprise a first spectral characteristic (e.g., comprising first pitches), the fan is at a first state. During the operation of the wearable head device, the fan is detected (e.g., using a microphone) to emit the first spectral characteristic. In accordance with a determination that the fan is detected to emit the spectral characteristic, it is determined that the fan is in the first state, and the fan reference signal 702 is derived accordingly.

In some embodiments, the fan reference signal 702 changes in response to a change in a state of a corresponding fan. For example, the fan reference signal 702 changes in response to a change in a speed of a fan from a first speed to a second speed (e.g., the different fan speeds correspond to different noises that the wearable head device is configured to compensate). As another example, the fan reference signal 702 changes in response to a change in a mode of a fan from a first mode to a second mode (e.g., the different fan modes correspond to different noises that the wearable head device is configured to compensate). In some embodiments, the change in fan state is gradual to minimize an abrupt change in fan noise pitch.

In some embodiments, after the wearable head device computes a new anti-noise signal corresponding to the change of fan state, the wearable head device may realign the new anti-noise signal such that the anti-noise signal and new noise signal (e.g., corresponding to the new fan state) are in-phase (e.g., the anti-noise signal is a negative signal) or out-of-phase (e.g., the anti-noise signal is a positive signal).

In some embodiments, the feedback and noise reduction block 708A or 708B comprises a linear time-domain feedback canceller, a frequency-domain noise suppressor, and a residual echo suppressor. In some embodiments, the feedback and noise reduction block 708A or 708B comprises a deep-learning based feedback canceller (e.g., the feedback canceller is in communication with a deep-learning network for determining parameters (e.g., fan reference signal, identification of sounds from mic inputs) for feedback cancellation). In some embodiments, the feedback and noise reduction block 708A or 708B comprises a deep-learning based noise reducer (e.g., the feedback canceller is in communication with a deep-learning network for determining parameters (e.g., fan reference signal, identification of sounds from mic inputs) for noise reduction). In some embodiments, the feedback and noise reduction block 708A or 708B comprises a deep-learning based echo canceller (e.g., the feedback canceller is in communication with a deep-learning network for determining parameters (e.g., fan reference signal, identification of sounds from mic inputs) for echo cancellation).

In some embodiments, each of the feedback and noise reduction blocks 708A and 708B receives two speaker reference signals (e.g., from speaker 706 and a speaker on another side of the wearable head device, from a left speaker and a right speaker of the wearable head device). In some embodiments, the speaker reference signals are used determining an output for reducing a level of sound from the speakers to a microphone or to an ear canal. In some embodiments, the feedback and noise reduction block 708A is coupled to the microphone 704A, and the feedback and noise reduction block 708B is coupled to the microphone 704B.

In some embodiments, the feedback and noise reduction block 708A or 708B receives the fan reference signal 702 and signals from a respective microphone, and based on the received fan reference signal 702 and the signals from the respective microphone, the feedback and noise reduction block 708A or 708B continuously estimate a fan-to-microphone response. For example, each of the feedback and noise reduction block 708A and 708B comprises an acoustic echo canceller (e.g., a Mono_AEC block), which is configured to adaptively cancel out a fan noise signal component detected by a respective microphone. The acoustic echo canceller may cancel out the fan noise signal by adaptively calculating a fan-to-microphone response and/or an echo return signal. The fan-to-microphone response and/or echo return signal may be calculated by comparing an incoming microphone signal (e.g., from microphone 704A, from microphone 704B) with a reference signal (e.g., fan reference signal 702).

In some embodiments, an acoustic echo canceller (AEC) comprises an adaptive filter that attempts to remove reverberation and discrete echoes that may occur when a signal feeds into a microphone. The signal is transmitted across a communications channel, reproduced at the far end over a loudspeaker, picked up by a far-end microphone, returned to the sender, and reproduced for the sender via a loudspeaker.

Based on the fan-to-microphone response, the feedback and noise reduction block 708A or 708B generates a compensation signal and sends the compensation signal to the fan noise reduction block 710 (e.g., if the fan-to-microphone response is known, then the fan noise reduction block 710 would determine an appropriate signal for outputting an anti-noise signal to reduce a level of fan noise received at a corresponding microphone). In some embodiments, the acoustic echo canceller of the feedback and noise reduction block 708A derives a side microphone return signal (e.g., corresponding to microphone 704A). The side microphone return signal is the compensation signal corresponding to the microphone 704A. In some embodiments, the fan noise reduction block 710 applies a speaker-to-ear transfer function (e.g., a transfer function between a speaker (e.g., speaker 606, speaker 706) and an ear canal (e.g., ear canal 608) predicted by the wearable head device) to the side microphone return signal (e.g., filters the side microphone return signal). In some embodiments, the transfer function is derived by the acoustic echo canceller. Then fan noise reduction block 710 subtracts the processed side microphone return signal (e.g., the filtered side microphone return signal) from a speaker output signal to generate the anti-noise signal.

In some embodiments, the acoustic echo canceller of the feedback and noise reduction block 708B derives a front microphone return signal (e.g., corresponding to microphone 704B). The front microphone return signal is the compensation signal corresponding to the microphone 704B. In some embodiments, the fan noise reduction block 710 applies a speaker-to-ear transfer function (e.g., a transfer function between a speaker (e.g., speaker 606, speaker 706) and an ear canal (e.g., ear canal 608) predicted by the wearable head device) to the front microphone return signal (e.g., filters the front microphone return signal). In some embodiments, the transfer function is derived by the acoustic echo canceller. Then fan noise reduction block 710 subtracts the processed front microphone return signal (e.g., the filtered front microphone return signal) from a speaker output signal to generate the anti-noise signal.

In some embodiments, the fan noise reduction block 710 receives a compensation signal from the feedback and noise reduction block 708A and/or the feedback and noise reduction block 708B to derive a fan-to-ear response. In some embodiments, based on the fan-to-ear response, the fan noise reduction block 710 derives a noise compensation signal (e.g., if the fan-to-ear response is known, then the fan noise reduction block 710 would determine an appropriate signal for outputting an anti-noise signal to reduce a level of fan noise received at a user's ear (e.g., ear canal 608)). The speaker 706 may receive the noise compensation signal and output a compensating audio signal accordingly. In some embodiments, the fan-to-ear response corresponds to a frequency range (e.g., lower than 4 kHz, lower than 3 kHz). An upper bound of the frequency range (e.g., 4 kHz) may be dependent on a location of the wearable head device relative to a user's ears (e.g., ear canal 608), a shape of a user's ears, and/or pinna diffraction effects (e.g., above 4 kHz).

In some embodiments, the wearable head device 700 performs non-linear processing in response to detection of a speaker feed signal that is loud enough to mask a fan noise. In response to detecting the speaker feed signal, the wearable head device 700 reduces a level of the speaker feed signal. For example, the wearable head device 700 performs non-linear processing in response to detection of a speaker feed signal under 400 Hz that is loud enough to mask the fan noise. The non-linear processing may be localized (e.g., performed for a corresponding speaker and not for the entire system).

In some embodiments, the wearable head device receives a parameter for determining an amount of compensation (e.g., fan-to-microphone response, fan-to-ear response, fan-to-speaker response) from a source external to the wearable head device's computations (e.g., from a server, from a second wearable head device, pre-loaded into the wearable head device). In some embodiments, the value of the parameter is determined based on similar operating conditions (e.g., fan reference signal value, ambient noise level) of a second wearable head device. Because the second wearable head device already determined an appropriate value of the parameter for fan noise compensation for the similar operating conditions, the second wearable head device may save these appropriate values on the device or at a server. When the first wearable head device requires fan noise compensation under similar operating conditions, the first wearable head device may receive the appropriate value of the parameter for fan noise compensation from the second wearable head device or from the server.

In some embodiments, the values of the parameter are determined using machine learning or artificial intelligence techniques by a server in communication with the first wearable head device (e.g., machine learning or artificial intelligence estimates an effect of fan noise and appropriate values of the parameter for compensating the effects of fan noise). Based on the values determined using machine learning or artificial intelligence, the first wearable head device may receive the appropriate value of the parameter for fan noise compensation from the server.

For example, a deep neural network (DNN) or another machine learning-based approach may be trained with audio recording of fans, audio (e.g., clean speech) in the presence of fan noise, and audio in the presence of (1) fan noise and (2) other noises (e.g., non-stationary distractor noise). From this training, the DNN may be able to derive the audio from the fan noise and/or other noises. In some examples, a DNN-based spectral subtraction is applied to sounds including an audio (e.g., clean speech) and noise (e.g., fan noise and/or other noises) to produce the audio without the noise. In some embodiments, the audio without noise is produced in real time.

In some embodiments, to improve performance, the wearable head device 700 includes more performance contributing components, such as CPUs, GPUs, embedded processors, DSPs, and/or power supplies, all of which may produce heat during operation. The fan (e.g. corresponding to fan reference signal 702) may be designed to reduce the heat produced during operation (e.g., to dissipate heat away from a user's body, to reduce heat from these components to optimize performance and reliability). In some instances, incorporating more electronic components to improve performance would generate more heat, and more fans (or a more powerful fan) may be needed to dissipate the additional heat. The noise created by these fans may minimize microphone fidelity and/or that of audio presented to a user during playback, limiting acoustic communication intelligibility and end-to-end user experience. In some embodiments, the wearable head device 700 advantageously mitigates these limitations caused by fan noise, restoring fidelity to audio path and improving the overall user experience while allowing more electronic components to be incorporated to improve performance.

Furthermore, it may not be practical to place a microphone next to a user's ear canal (e.g., ear canal 608), next to a recording microphone, and/or next to the fan to determine the different transfer functions between the speaker, the recording microphone, and the fan. For example, cost, space, or safety constraints may limit the placement of the microphone. The wearable head device 700 advantageously allows the determination of these responses without a need for inefficiently arranged or placed microphones.

Although one side of the wearable head device 700 is described, it is understood the components described with respect to FIG. 7 are not limited to being located on a specific side. The fan, the speaker, or the microphone may be located on a right side, backside, or front side of the wearable head device, instead of or in addition to the left side. The speaker may be configured to reduce the effects of the fan noise according to a location of the fan.

It is also understood that additional components may be located on other sides of the wearable head device. In some embodiments, the wearable head device also includes microphones and a speaker on its right side at symmetrical locations. For example, the right side of the wearable head device also includes a fan, microphones, and speakers on its right side at symmetrical locations. As such, the speakers on the right side may be configured to reduce effects of the right side fan (e.g., by outputting an anti-noise signal), as disclosed herein. Additionally, the speakers on the left side may be configured to reduce effects of both fans, and the speakers on the right side may be configured to reduce effects of both fans.

It is also understood that the number of microphones, microphone locations, number of speakers, speaker locations, fan reference signal, feedback and noise reduction blocks, and fan noise reduction block described with respect to FIG. 7 are exemplary. For example, the wearable head device may include more than two microphones on each side. As another example, the microphones of the wearable head device may be arranged differently than illustrated. As yet another example, the wearable head device may include more than one speaker on each side. As yet another example, the wearable head device includes more than one fan reference signal (e.g., corresponding to a number of fans). As yet another example, the wearable head device may include less than two or more than two feedback and noise reduction blocks (e.g., corresponding to a number of microphones). As yet another example, the wearable head device may include more than one fan noise reduction block (e.g., corresponding to a number of speakers).

Figure 8:
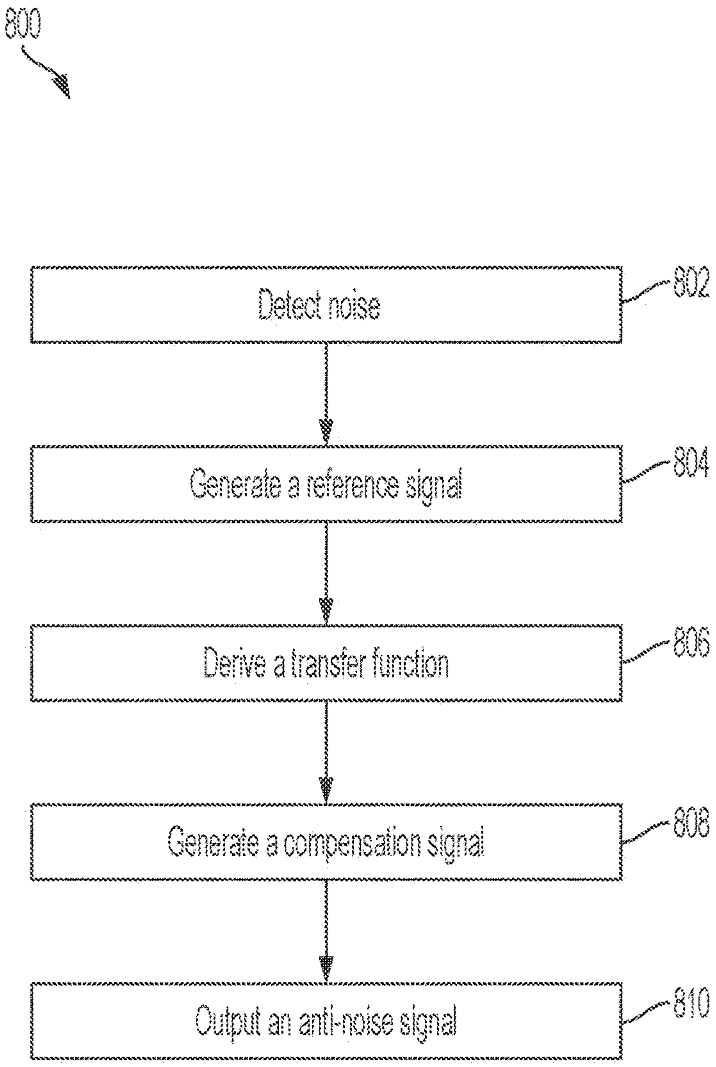
FIG. 8 illustrates an exemplary method of operating a wearable head device according to some embodiments of the disclosure.

FIG. 8 illustrates an exemplary method 800 of operating a wearable head device according to some embodiments of the disclosure. Although the method 800 is illustrated as including the described steps, it is understood that a different order of steps, additional steps, or fewer steps may be included without departing from the scope of the disclosure. For the sake of brevity, some examples and advantages described with respect to FIGS. 6 and 7 are not described here.

In some embodiments, the method 800 includes detecting, with a microphone of the wearable head device, noise generated by the fan (step 802). For example, in some embodiments, a fan (e.g., fan 602) of a wearable head device (e.g., wearable head device 600, wearable head device 700) is operating, and a microphone of the wearable head device detects noise generated by the fan. In some embodiments, the noise comprises a frequency in a range of 0 to 4 kHz (e.g., the fan exhibits a noise spectrum whose power lies primarily at a frequency below 3-4 kHz). The noise may comprise noise caused by acoustic and/or mechanical coupling with the operation of the fan. In some embodiments, while the audible noise is primary at a frequency of 3-4 kHz or below, the noise comprises a frequency far below 3-4 kHz. For example, operating the fan comprises revolving the fan at a rate of 800-5000 revolutions per minute (RPM). As another example, operating the fan comprises revolving the fan at a rate of 800-2000 RPM. For example, as described with respect to fan 602, the fan may be operated such that the noise comprises a frequency below 3-4 kHz to minimize fan power at higher frequencies. By minimizing fan power at higher frequencies, the need to compensate for this varying noise at higher frequencies may be advantageously minimized.

In some embodiments, the method 800 includes generating a fan reference signal, wherein the fan reference signal represents at least one of a speed of the fan, a mode of the fan, a power output of the fan, and a phase of the fan (step 804). For example, as described with respect to FIG. 6 or 7, the wearable head device generates a fan reference signal (e.g., fan reference signal 702) representing at least one of speed of the fan (e.g., fan 602), mode of the fan, power output of the fan, and phase of the fan.

In some embodiments, the method 800 includes deriving a transfer function based on the fan reference signal and based further on the detected noise of the fan (step 806). For example, as described with respect to FIG. 7, the wearable head device 700 derives a transfer function based on the fan reference signal and the detected noise of the fan. In some embodiments, the transfer function comprises a fan-to-microphone transfer function (e.g., a fan-to-microphone response). In some embodiments, the transfer function comprises a fan-to-ear transfer function (e.g., a fan-to-ear response).

In some embodiments, the method 800 includes receiving a speaker reference signal, wherein the transfer function is further based on the speaker reference signal. For example, as described with respect to FIG. 7, the fan-to-microphone response or the fan-to-ear response is based on a speaker reference signal (e.g., the speaker reference signal received by feedback and noise reduction block 708A or 708B).

In some embodiments, the method 800 includes generating a compensation signal based on the transfer function (step 808). For example, as described with respect to FIG. 7, the wearable head device 700 generates a compensation signal (e.g., a compensation signal generated by the feedback and noise reduction block 708A or 708B) based on the transfer function.

In some embodiments, the wearable head device comprises an acoustic echo canceller. In some embodiments, deriving the transfer function is performed via the acoustic echo canceller. In some embodiments, generating the compensation signal is performed via the acoustic echo canceller. For example, as described with respect to FIG. 7, the acoustic echo canceller of feedback and noise reduction block 708A or 708B derives a transfer function and/or generates a compensation signal.

In some embodiments, the method 800 includes while operating the fan of the wearable head device, outputting, by a speaker of the wearable head device, an anti-noise signal (step 810). In some embodiments, the anti-noise signal is based on the compensation signal. For example, as described with respect to FIG. 7, a speaker of the wearable head device 700 outputs an anti-noise signal based on the compensation signal (e.g., while the fan of the wearable device is operating).

In some embodiments, the anti-noise signal reduces a level of fan noise received at a microphone. For example, the anti-noise signal, outputted by a speaker, reduces a level of noise received by the microphone by cancelling (e.g., destructively interfere) at least a part of the noise (e.g., based on a fan-to-microphone response).

In some embodiments, the anti-noise signal comprises a periodic signal. In some embodiments, the method 800 includes aligning a phase of the anti-noise signal with a phase of the noise generated by the fan. For example, as described with respect to FIG. 6, the noise from the fan 602 comprises a periodic signal (e.g., because the motion of the fan is periodic, the noise is mainly periodic). For example, the noise comprises multiple dominate frequency components. The periodicity of the fan noise advantageously may allow the wearable head device time to compute the appropriate anti-noise output for reducing the noise (e.g., an anti-noise signal comprising a periodic signal), such that real time noise reduction is not required. For example, after the wearable head device computes the appropriate anti-noise signal, the wearable head device may delay the periodic anti-noise signal such that the anti-noise signal and noise signal are in-phase (e.g., the anti-noise signal is a negative signal) or out-of-phase (e.g., the anti-noise signal is a positive signal). In some embodiments, this delay is adjusted (e.g., the phase of the anti-noise signal is adjusted) until the effect of fan noise is at a minimum. In some embodiment, this delay is determined based on information about the fan (e.g., from the fan reference signal, determined from detected sounds of the fan).

In some embodiments, the anti-noise signal reduces a level of fan noise received at an ear canal of a user of the wearable head device. For example, the anti-noise signal, outputted by a speaker, reduces a level of noise perceived by a user of the wearable head device by cancelling (e.g., destructively interfere) at least a part of the noise (e.g., based on a fan-to-ear response).

In some embodiments, the method 800 includes changing an operation of the fan from a first state to a second state. For example, as described with respect to FIGS. 6 and 7, a fan (e.g., fan 602) changes from a first state to a second state (e.g., at least one of speed of the fan, mode of the fan, power output of the fan, and phase of the fan changes). In some embodiments, the method 800 includes detecting, with the microphone, noise of the fan operating at the second state.

For example, as described with respect to step 802, the microphone detects the noise of the fan operating at the second state.

In some embodiments, the method 800 includes updating the fan reference signal based on the changing of the operation. For example, the fan reference signal generated from step 804 is updated based on the fan operating at the second state (e.g., based on at least one of speed of the fan, mode of the fan, power output of the fan, and phase of the fan changes). In some embodiments, the method 800 includes deriving a second transfer function based on the updated fan reference signal and the detected noise of the fan operating at the second state. For example, the wearable head device (e.g., wearable head device 600, wearable head device 700) derives a second transfer function (e.g., a second fan-to-microphone response, a second fan-to-ear response) based on the changing of the operation.

In some embodiments, the method 800 includes generating a second compensation signal based on the second transfer function. For example, the wearable head device 700 generates a second compensation signal (e.g., a second compensation signal generated by the feedback and noise reduction block 708A or 708B) based on the second transfer function. In some embodiments, the method 800 includes concurrently with operating the fan at the second state, outputting, by the speaker, a second anti-noise signal. In some embodiments, the second anti-noise signal is based on the second compensation signal. For example, a speaker of the wearable head device 700 outputs a second anti-noise signal based on the second compensation signal (e.g., while the fan of the wearable device is operating at the second state).

In some embodiments, the method 800 includes receiving a second compensation signal, wherein the second compensation signal comprises an output of a DNN based (or another machine learning-based approach) subtraction based on a recorded sound; and outputting, by the speaker of the wearable head device, a second anti-noise signal, wherein the second anti-noise signal is based on the second compensation signal and is configured to reduce a level of noise associated with the recorded sound. For example, as described with respect to FIG. 7, a DNN may be trained with audio recording of fans, audio (e.g., clean speech) in the presence of fan noise, and audio in the presence of (1) fan noise and (2) other noises (e.g., non-stationary distractor noise). From this training, the DNN may be able to derive the audio from the fan noise and/or other noises. In some examples, a DNN-based spectral subtraction is applied to sounds including an audio (e.g., clean speech) and noise (e.g., fan noise and/or other noises) to produce the audio without the noise. In some embodiments, the audio without noise is produced in real time.

In some embodiments, the method 800 includes detecting a speaker feed signal from the speaker; and in response to detecting the speaker feed signal, reducing a level of the speaker feed signal. For example, as described with respect to FIG. 7, the wearable head device 700 performs non-linear processing in response to detection of a speaker feed signal that is loud enough to mask a fan noise. In response to detecting the speaker feed signal, the wearable head device 700 reduces a level of the speaker feed signal. For example, the wearable head device 700 performs non-linear processing in response to detection of a speaker feed signal under 400 Hz that is loud enough to mask the fan noise. The non-linear processing may be localized (e.g., performed for a corresponding speaker and not for the entire system).

Although examples of the disclosure are described with respect to reducing the effects of fan noise, it is understood that these examples are merely exemplary. It is understood that the disclosed systems and methods may also be used to actively reduce other effects of noises. For example, instead of receiving a fan reference signal, the disclosed systems may receive other reference signals, in lieu of or in addition to the fan reference signal. Examples of other reference signals include an ambient noise reference signal and feedback noise reference signal. In some embodiments, a reference signal is associated with at least one of sound generated by a device speaker and motor noise (e.g., from a lens system of a device, from a motorized camera or mic system. These reference signals may be detected by a disclosed microphone and converted into a signal (e.g., into an input signal for the wearable head device 600 or wearable head device 700) for performing the disclosed active noise reduction (e.g., to actively reduce noise at a noisy environment (e.g., factory, data center, assembly line)). For example, a disclosed system may determine transfer function(s) between the ear, the mic, the speaker, and the noise, and apply the transfer functions on the signal to generate an anti-noise signal for noise reduction.

Although examples of the disclosure are described with respect to reducing the effects of noise on an AR, MR, or XR system, it is understood that these examples are merely exemplary. It is understood that the disclosed noise level reduction systems and methods may be used for other kinds of systems. For example, the disclosed noise level reduction systems and methods may be incorporated into other kinds of wearable systems that may benefit from noise level reduction (e.g., to improve user experience). For example, the disclosed noise level reduction systems and methods may be incorporated into military or first responder helmets (e.g., to reduce noise level of fans for cooling a user or electronic components, to reduce ambient noises) to reduce user distraction.

With respect to the systems and methods described herein, elements of the systems and methods can be implemented by one or more computer processors (e.g., CPUs or DSPs) as appropriate. The disclosure is not limited to any particular configuration of computer hardware, including computer processors, used to implement these elements. In some cases, multiple computer systems can be employed to implement the systems and methods described herein. For example, a first computer processor (e.g., a processor of a wearable device coupled to one or more microphones) can be utilized to receive input microphone signals, and perform initial processing of those signals (e.g., signal conditioning and/or segmentation, such as described herein). A second (and perhaps more computationally powerful) processor can then be utilized to perform more computationally intensive processing, such as determining probability values associated with speech segments of those signals. Another computer device, such as a cloud server, can host a speech processing engine, to which input signals are ultimately provided. Other suitable configurations will be apparent and are within the scope of the disclosure.

According to some embodiments, a method comprises: operating a fan of a wearable head device; detecting, with a microphone of the wearable head device, noise generated by the fan; generating a fan reference signal, wherein the fan reference signal represents at least one of a speed of the fan, a mode of the fan, a power output of the fan, and a phase of the fan; deriving a transfer function based on the fan reference signal and based further on the detected noise of the fan; generating a compensation signal based on the transfer function; and while operating the fan of the wearable head device, outputting, by a speaker of the wearable head device, an anti-noise signal, wherein the anti-noise signal is based on the compensation signal.

According to some embodiments, the anti-noise signal reduces a level of fan noise received at a second microphone.

According to some embodiments, the anti-noise signal reduces a level of fan noise received at an ear canal of a user of the wearable head device.

According to some embodiments, the transfer function comprises a fan-to-microphone transfer function.

According to some embodiments, the transfer function comprises a fan-to-ear transfer function.

According to some embodiments, the noise comprises a frequency in a range of 0 to 4 kHz.

According to some embodiments, operating the fan comprises revolving the fan at a rate of 800-5000 RPM.

According to some embodiments, the method further comprises: changing an operation of the fan from a first state to a second state; detecting, with the microphone, noise of the fan operating at the second state; updating the fan reference signal based on the changing of the operation; deriving a second transfer function based on the updated fan reference signal and the detected noise of the fan operating at the second state; generating a second compensation signal based on the second transfer function; and concurrently with operating the fan at the second state, outputting, by the speaker, a second anti-noise signal, wherein the second anti-noise signal is based on the second compensation signal.

According to some embodiments, the wearable head device comprises an acoustic echo canceller; deriving the transfer function is performed via the acoustic echo canceller; and generating the compensation signal is performed via the acoustic echo canceller.

According to some embodiments, the method further comprises receiving a second compensation signal, wherein the second compensation signal comprises an output of a deep neural network (DNN) based subtraction based on a recorded sound; and outputting, by the speaker of the wearable head device, a second anti-noise signal, wherein the second anti-noise signal is based on the second compensation signal and is configured to reduce a level of noise associated with the recorded sound.

According to some embodiments, the anti-noise signal comprises a periodic signal.

According to some embodiments, the method further comprises receiving a speaker reference signal, wherein the transfer function is further based on the speaker reference signal.

According to some embodiments, the method further comprises detecting a speaker feed signal from the speaker; and in response to detecting the speaker feed signal, reducing a level of the speaker feed signal.

According to some embodiments, the method further comprises aligning a phase of the anti-noise signal with a phase of the noise generated by the fan.

According to some embodiments, the anti-noise signal comprises signals having frequencies below 4 kHz.

According to some embodiments, operating the fan comprises revolving the fan at a rate of 800-5000 RPM.

According to some embodiments, a system comprises: a wearable head device comprising a fan, a microphone, and a speaker; and one or more processors configured to execute a method comprising: operating the fan; detecting, with the microphone, noise generated by the fan; generating a fan reference signal, wherein the fan reference signal represents at least one of a speed of the fan, a mode of the fan, a power output of the fan, and a phase of the fan; deriving a transfer function based on the fan reference signal and based further on the detected noise of the fan; generating a compensation signal based on the transfer function; and while operating the fan, outputting, by the speaker, an anti-noise signal, wherein the anti-noise signal is based on the compensation signal.

According to some embodiments, the fan is configured to cool the one or more processors.

According to some embodiments, the anti-noise signal reduces a level of fan noise received at a second microphone.

According to some embodiments, the anti-noise signal reduces a level of fan noise received at an ear canal of a user of the wearable head device.

According to some embodiments, the transfer function comprises a fan-to-microphone transfer function.

According to some embodiments, the transfer function comprises a fan-to-ear transfer function.

According to some embodiments, the noise comprises a frequency in a range of 0 to 4 kHz.

According to some embodiments, operating the fan comprises revolving the fan at a rate of 800-5000 RPM.

According to some embodiments, the method further comprises: changing an operation of the fan from a first state to a second state; detecting, with the microphone, noise of the fan operating at the second state; updating the fan reference signal based on the changing of the operation; deriving a second transfer function based on the updated fan reference signal and the detected noise of the fan operating at the second state; generating a second compensation signal based on the second transfer function; and concurrently with operating the fan at the second state, outputting, by the speaker, a second anti-noise signal, wherein the second anti-noise signal is based on the second compensation signal.

According to some embodiments, the wearable head device comprises an acoustic echo canceller; deriving the transfer function is performed via the acoustic echo canceller; and generating the compensation signal is performed via the acoustic echo canceller.

According to some embodiments, the method further comprises: receiving a second compensation signal, wherein the second compensation signal comprises an output of a deep neural network (DNN) based subtraction based on a recorded sound; and outputting, by the speaker of the wearable head device, a second anti-noise signal, wherein the second anti-noise signal is based on the second compensation signal and is configured to reduce a level of noise associated with the recorded sound.

According to some embodiments, the anti-noise signal comprises a periodic signal.

According to some embodiments, the method further comprises receiving a speaker reference signal, wherein the transfer function is further based on the speaker reference signal.

According to some embodiments, the method further comprises: detecting a speaker feed signal from the speaker; and in response to detecting the speaker feed signal, reducing a level of the speaker feed signal.

According to some embodiments, the method further comprises aligning a phase of the anti-noise signal with a phase of the noise generated by the fan.

According to some embodiments, the anti-noise signal comprises signals having frequencies below 4 kHz.

According to some embodiments, a non-transitory computer-readable medium storing instructions that, when executed by one or more processors, cause the one or more processors to execute a method comprising: operating a fan of a wearable head device; detecting, with a microphone of the wearable head device, noise generated by the fan; generating a fan reference signal, wherein the fan reference signal represents at least one of a speed of the fan, a mode of the fan, a power output of the fan, and a phase of the fan; deriving a transfer function based on the fan reference signal and based further on the detected noise of the fan; generating a compensation signal based on the transfer function; and while operating the fan of the wearable head device, outputting, by a speaker of the wearable head device, an anti-noise signal, wherein the anti-noise signal is based on the compensation signal.

According to some embodiments, the anti-noise signal reduces a level of fan noise received at a microphone.

According to some embodiments, the anti-noise signal reduces a level of fan noise received at an ear canal of a user of the wearable head device.

According to some embodiments, the transfer function comprises a fan-to-microphone transfer function.

According to some embodiments, the transfer function comprises a fan-to-ear transfer function.

According to some embodiments, the noise comprises a frequency in a range of 0 to 4 kHz.

According to some embodiments, operating the fan comprises revolving the fan at a rate of 800-5000 RPM.

According to some embodiments, the method further comprises: changing an operation of the fan from a first state to a second state; detecting, with the microphone, noise of the fan operating at the second state; updating the fan reference signal based on the changing of the operation; deriving a second transfer function based on the updated fan reference signal and the detected noise of the fan operating at the second state; generating a second compensation signal based on the second transfer function; and concurrently with operating the fan at the second state, outputting, by the speaker, a second anti-noise signal, wherein the second anti-noise signal is based on the second compensation signal.

According to some embodiments, the wearable head device comprises an acoustic echo canceller; deriving the transfer function is performed via the acoustic echo canceller; and generating the compensation signal is performed via the acoustic echo canceller.

According to some embodiments, the method further comprises: receiving a second compensation signal, wherein the second compensation signal comprises an output of a deep neural network (DNN) based subtraction based on a recorded sound; and outputting, by the speaker of the wearable head device, a second anti-noise signal, wherein the second anti-noise signal is based on the second compensation signal and is configured to reduce a level of noise associated with the recorded sound.

According to some embodiments, the anti-noise signal comprises a periodic signal.

According to some embodiments, the method further comprises receiving a speaker reference signal, wherein the transfer function is further based on the speaker reference signal.

According to some embodiments, the method further comprises: detecting a speaker feed signal from the speaker; and in response to detecting the speaker feed signal, reducing a level of the speaker feed signal.

According to some embodiments, the method further comprises aligning a phase of the anti-noise signal with a phase of the noise generated by the fan.

According to some embodiments, the anti-noise signal comprises signals having frequencies below 4 kHz.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method comprising:

operating a fan of a wearable head device;

detecting, with a microphone of the wearable head device, noise generated by the fan;

generating a fan reference signal;

deriving a transfer function based on the fan reference signal and based further on the detected noise of the fan;

generating a compensation signal based on the transfer function; and while operating the fan of the wearable head device, outputting, by a speaker of the wearable head device, an anti-noise signal, wherein the anti-noise signal is based on the compensation signal.

2. The method of claim 1, wherein the fan reference signal represents at least one of a speed of the fan, a mode of the fan, a power output of the fan, and a phase of the fan.

3. The method of claim 1, wherein the anti-noise signal reduces a level of fan noise received at a second microphone.

4. The method of claim 1, wherein the anti-noise signal reduces a level of fan noise received at an ear canal of a user of the wearable head device.

5. The method of claim 1, wherein the transfer function comprises a fan-to-microphone transfer function.

6. The method of claim 1, wherein the transfer function comprises a fan-to-ear transfer function.

7. The method of claim 1, wherein the noise comprises a frequency in a range of 0 to 4 kHz.

8. The method of claim 1, wherein the operating the fan comprises revolving the fan at a rate of 800-5000 revolutions per minute.

9. The method of claim 1, further comprising:

changing an operation of the fan from a first state to a second state;

detecting, with the microphone, noise of the fan operating at the second state;

updating the fan reference signal based on said changing of the operation;

deriving a second transfer function based on the updated fan reference signal and based further on the detected noise of the fan operating at the second state;

generating a second compensation signal based on the second transfer function; and concurrently with the operating the fan at the second state, outputting, by the speaker, a second anti-noise signal, wherein the second anti-noise signal is based on the second compensation signal.

10. The method of claim 1, wherein:

the wearable head device comprises an acoustic echo canceller;

the deriving the transfer function is performed via the acoustic echo canceller; and the generating the compensation signal is performed via the acoustic echo canceller.

11. The method of claim 1, further comprising:

receiving a second compensation signal, wherein the second compensation signal comprises an output of a deep neural network (DNN) based subtraction based on a recorded sound; and outputting, by the speaker of the wearable head device, a second anti-noise signal, wherein the second anti-noise signal is based on the second compensation signal and is configured to reduce a level of noise associated with the recorded sound.

12. The method of claim 1, wherein the anti-noise signal comprises a periodic signal.

13. The method of claim 1, further comprising receiving a speaker reference signal, wherein the transfer function is further based on the speaker reference signal.

14. The method of claim 1, further comprising:

detecting a speaker feed signal from the speaker; and in response to detecting the speaker feed signal, reducing a level of the speaker feed signal.

15. The method of claim 1, further comprising aligning a phase of the anti-noise signal with a phase of the noise generated by the fan.

16. The method of claim 1, wherein the anti-noise signal comprises signals having frequencies below 4 kHz.

17. A system comprising:

a wearable head device comprising a fan, a microphone, and a speaker; and one or more processors configured to perform a method comprising:

operating the fan;

detecting, with the microphone, noise generated by the fan;

generating a fan reference signal;

deriving a transfer function based on the fan reference signal and based further on the detected noise of the fan;

generating a compensation signal based on the transfer function; and while operating the fan of the wearable head device, outputting, by the speaker, an anti-noise signal, wherein the anti-noise signal is based on the compensation signal.

18. A non-transitory computer-readable medium storing instructions that, when executed by one or more processors, cause the one or more processors to perform a method comprising:

operating a fan of a wearable head device;

detecting, with a microphone of the wearable head device, noise generated by the fan;

generating a fan reference signal;

deriving a transfer function based on the fan reference signal and based further on the detected noise of the fan;

generating a compensation signal based on the transfer function; and while operating the fan of the wearable head device, outputting, by a speaker of the wearable head device, an anti-noise signal, wherein the anti-noise signal is based on the compensation signal.

* * * * *